(12) United States Patent
Rönneke et al.

(10) Patent No.: US 11,297,061 B2
(45) Date of Patent: *Apr. 5, 2022

(54) METHODS AND NODES FOR HANDLING OVERLOAD

(71) Applicant: TELEFONAKTIEBOLAGET LM ERICSSON (PUBL), Stockholm (SE)

(72) Inventors: Hans Bertil Rönneke, Kungsbacka (SE); Peter Hedman, Helsingborg (SE); Shabnam Sultana, Montreal (CA)

(73) Assignee: TELEPONAKTIEBOLAGET L M ERICSSON (PUBL), Stockholm (SE)

( * ) Notice: Subject to any disclaimer, the term of this patent is extended or adjusted under 35 U.S.C. 154(b) by 83 days.

This patent is subject to a terminal disclaimer.

(21) Appl. No.: 17/024,961

(22) Filed: Sep. 18, 2020

(65) Prior Publication Data
US 2021/0006562 A1 Jan. 7, 2021

Related U.S. Application Data

(63) Continuation of application No. 14/387,746, filed as application No. PCT/EP2014/070061 on Sep. 19, 2014, now Pat. No. 10,812,488.

(51) Int. Cl.
*H04L 29/06* (2006.01)
*H04W 12/08* (2021.01)
(Continued)

(52) U.S. Cl.
CPC ......... *H04L 63/101* (2013.01); *H04W 12/082* (2021.01); *H04W 28/0284* (2013.01); *H04W 28/0289* (2013.01); *H04W 80/04* (2013.01)

(58) Field of Classification Search
CPC .............. H04L 63/101; H04W 12/082; H04W 28/0284; H04W 28/0289
See application file for complete search history.

(56) References Cited

U.S. PATENT DOCUMENTS 7,072,340 B2 * 7/2006 Agrawal .......... H04L 29/12311
370/392
9,037,849 B2 5/2015 Koster et al.
(Continued)

OTHER PUBLICATIONS

3GPP, 3rd Generation Partnership Project; Technical Specification Group Services and System Aspects; General Packet Radio Service (GPRS) enhancements for Evolved Universal Terrestrial Radio Access Network (E-UTRAN) access (Release 12), 3GPP TS 23.401, V12.5.0, 2014, 305 pages.
(Continued)

*Primary Examiner* — Kevin C. Harper
*Assistant Examiner* — Henry Baron
(74) *Attorney, Agent, or Firm* — Rothwell, Figg, Ernst & Manbeck, P.C.

(57) ABSTRACT

The embodiments herein relate to a method in a mobility management node (108) for handling overload in a communications network (100). When overload in the communications network (100) has been detected, the mobility management node (108) receives information indicating at least one blocked IP address to which access should be blocked. The mobility management node (108) receives a communication request message from a UE (101) via a RAN node (105). The communication request message is a request for communication by the UE (101). The mobility management node (108) determines that the UE's (101) request for communication should be rejected when the UE (101) is associated with a blocked IP address.

20 Claims, 14 Drawing Sheets

(51) Int. Cl.
*H04W 28/02* (2009.01)
*H04W 12/082* (2021.01)
*H04W 80/04* (2009.01)

(56) References Cited

U.S. PATENT DOCUMENTS

| | | |
|---|---|---|
| 2002/0101819 A1 | 8/2002 | Goldstone |
| 2006/0190603 A1 | 8/2006 | Anzai et al. |
| 2011/0107412 A1 | 5/2011 | Lee et al. |
| 2011/0314145 A1 | 12/2011 | Raleigh et al. |
| 2014/0241333 A1 | 8/2014 | Kim et al. |
| 2014/0269305 A1 | 9/2014 | Nguyen |
| 2017/0019750 A1 | 1/2017 | Palanisamy et al. |

OTHER PUBLICATIONS

NTT Docomo, KDDI "Discussion of Group-specific Congestion Control" SA WG2 Meeting #103, S2-141771, 2014, 5 pages.
NTT Docomo "Key issue on Group-specific NAS Level Congestion Control" SA WG2 Meeting #104, S2-142377, 2014, 2 pages.
International Search Report and the Written Opinion of the International Searching Authority dated Apr. 8, 2015, in International Application No. PCT/EP2014/070061, 15 pages.
3GPP, 3rd Generation Partnership Project; Technical Specification Group Services and System Aspects; System Improvements for Machine-Type Communications; (Release 11), 3GPP TR 23.888, V1.6.0, 2011, 161 pages.

\* cited by examiner

METHODS AND NODES FOR HANDLING OVERLOAD

CROSS REFERENCE TO RELATED APPLICATION(S)

This application is a continuation of U.S. application Ser. No. 14/387,746, filed Sep. 24, 2014, which is a 35 U.S.C. § 371 National Phase Entry Application from PCT/EP2014/070061, filed Sep. 19, 2014, designating the United States. The disclosures of each of the referenced applications are incorporated herein in their entirety by reference.

TECHNICAL FIELD

Embodiments herein relate generally to a mobility management node, a method in the mobility management node, a first gateway node, a method in the first gateway node, a second gateway node and a method in the second gateway node. More particularly the embodiments herein relate to handling communication requests in a communications network.

BACKGROUND

When a specific server is down, overloaded, congested, unreachable, failing, there is a need to limit the traffic from User Equipment's (UE) towards the server. When UEs are e.g. Machine to Machine (M2M) devices, applications in such M2M devices tend to be very persistent, and may cause high network load when many M2M devices running the same application tries to access the same server almost simultaneously and within a certain location which leads to termination towards a specific server. One Third Generation Partnership Project (3GPP) operator has reported a network outage because of this. In this case, 10 000 persistent UEs were enough to bring the network down (e.g. loss of the network's ability to allow devices or users to be able to connect).

As a result of this, it has been proposed to add a Group Specific Congestion control mechanism. Such Group Specific Congestion control mechanism groups subscriptions in subscriber servers such as e.g. the Home Subscriber Server (HSS) so that certain groups of subscriptions are blocked. There may be other alternatives to block access attempts to certain Access Point Names (APN) which is already supported in 3GPP specifications, but an APN based congestion solution may not be enough to support the required functionality. Instead, group identifiers may be added to the UE context in the mobility management node, e.g. the Mobility Management Entity (MME), and in the subscriber server, e.g. the HSS, and the operation system may trigger the mobility management node to reject Mobility Management signalling requests from all user equipments belonging to a certain Group.

The APN mentioned above is an identifier of a Packet Data Network (PDN) that a UE wants to communicate with. In addition to identify a PDN, an APN may also define the type of service that is provided by the APN, e.g. connection to a server such as an Application Server (AS). In other words, an APN is used to establish data connections between the UE and the Internet. The APN defines which type of IP address to use, which security methods to invoke, which fixed-end connections to use etc.

However, each UE may have several applications running and a specific communication may not be towards the congested service/server even though the UE may have an application that sometimes communicate with the congested service/server and then needs to belong to the specific group.

Another issue with the above is that proactive configuration of the network and subscription information is required, e.g. defining groups, or that APN planning/assignments need to consider overload control.

SUMMARY

An objective of embodiments herein is therefore to obviate at least one of the above disadvantages and to provide improved handling of communication requests.

According to a first aspect, the object is achieved by a method in a mobility management node for handling overload in a communications network. When overload in the communications network has been detected, the mobility management node receives information indicating at least one blocked IP address to which access should be blocked. The mobility management node receives a communication request message from a UE via a RAN node. The communication request message is a request for communication by the UE. The mobility management node determines that the UE's request for communication should be rejected when the UE is associated with a blocked IP address.

According to a second aspect, the object is achieved by a method in a first gateway node for handling overload in a communications network. The first gateway node receives, from a mobility management node, a request message for information of at least one used IP address of IP packets which has been previously sent by the UE. The first gateway node transmits, to the mobility management node, a response message comprising information of at least one used IP address.

According to a third aspect, the object is achieved by a method in a second gateway node for handling overload in a communications network. The second gateway node receive, from a mobility management node, information indicating at least one blocked IP address to which access should be blocked. The second gateway node receives an IP packet associated with a used IP address. The second gateway node compares used IP packets with the at least one blocked IP address. The second gateway node transmits, to the mobility management node, information indicating that the comparison resulted in a match between at least one blocked IP address and at least one used IP address.

According to a fourth aspect, the object is achieved by a mobility management node for handling overload in a communications network. The mobility management node is configured to, when overload in the communications network has been detected, receive information indicating at least one blocked IP address to which access should be blocked. The mobility management node is configured to receive a communication request message from a UE via a RAN node. The communication request message is a request for communication by the UE. The mobility management node is configured to determine that the UE's request for communication should be rejected when the UE is associated with a blocked IP address.

According to a fifth aspect, the object is achieved by a first gateway node for handling overload in a communications network. The first gateway node is configured to receive, from a mobility management node, a request message for information of at least one used IP address of IP packets which has been previously sent by the UE. The first gateway node is configured to transmit, to the mobility management node, a response message comprising information of at least one used IP address.

According to a sixth aspect, the object is achieved by a second gateway node for handling overload in a communications network. The second gateway node being configured to receive from a mobility management node, information indicating at least one blocked IP address to which access should be blocked. The second gateway node is configured to receive an IP packet associated with a used IP address, and to compare used IP packets with the at least one blocked IP address. Furthermore, the second gateway node is configured to transmit, to the mobility management node, information indicating that the comparison resulted in a match between at least one blocked IP address and at least one used IP address.

Since the mobility management node has information about blocked IP address(es), UEs which tries to request communication associated with such IP address(es) is blocked, i.e. the handling of communication requests is improved.

Embodiments herein afford many advantages, of which a non-exhaustive list of examples follows:

One advantage with the embodiments herein may be that that the network may control overload on Internet Protocol (IP) address level. Only the UEs that keep trying to connect to a dead server or host will be blocked from access. That is, the most selective form of overload control possible.

A further advantage of the embodiments herein may be that no new concepts such as Group Identifiers need to be defined and integrated into the network. IP address(es) are already handled by the network.

Another advantage of the embodiments herein may be that the overload control mechanism may not require any proactive configuration in the network or the UE. When the Network Operation Center (NOC) detects an unusual high load in the network where many UEs are requesting communication with the same IP address, they may immediately issue an Operation and Maintenance (O&M) command to mobility management nodes such as e.g. MMEs and Serving General packet radio service Support Nodes (SGSN), to block the particular IP address. This may save the network from being overloaded and from total network outages.

Another advantage of the embodiments herein may be that they do not require any impact to the UEs, so the embodiments may be deployed anytime and may be removed when no longer needed.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which:

FIG. 4b is a continuation of FIG. 4a.

FIG. 5b is a continuation of FIG. 5a.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
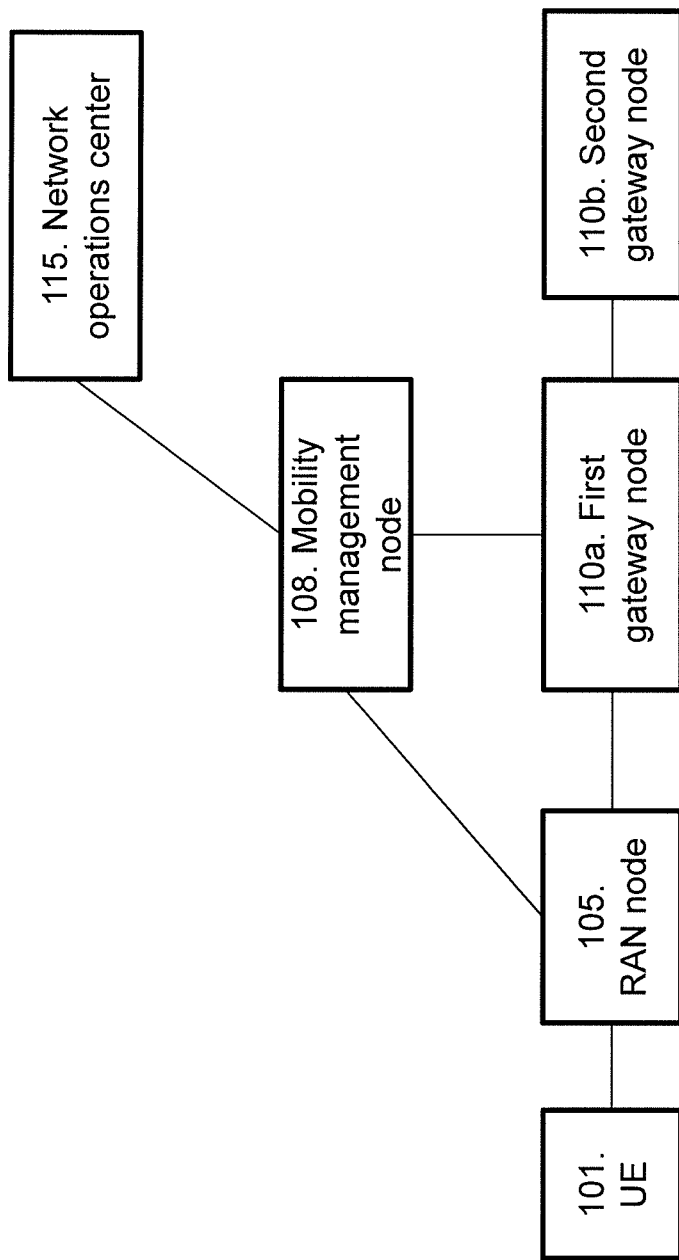
FIG. 1 is a schematic block diagram illustrating embodiments of a communications system.

FIG. 1 depicts a communications system 100 in which embodiments herein may be implemented. The communications system 100 may in some embodiments apply to one or more radio access technologies such as for example Long Term Evolution (LTE), LTE Advanced, Wideband Code Division Multiple Access (WCDMA), Global System for Mobile Communications (GSM), or any other (3GPP radio access technology, or other radio access technologies such as e.g. Wireless Local Area Network (WLAN).

A UE 101 may be served by a Radio Access Network (RAN) node 105, and is capable of communicating with the RAN node 105 over a communications link.

The UE 101 may be a device by which a subscriber may access services offered by an operator's network and services outside operator's network to which the operators radio access network and core network provide access, e.g. access to the Internet, access to a service providers network, access to an AS. The UE 101 may be any device, mobile or stationary, enabled to communicate in the communications network, for instance but not limited to e.g. terminal, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another UE or a server.

The RAN node 105 may be a base station such as a NodeB, an evolved Node B (eNodeB, eNB), Radio Network Controller (RNC) or any other network unit capable to communicate over the communications link with the UE 101.

A mobility management node 108 may be configured to be connected to the RAN node 105. The RAN node 105 may be a MME, a SGSN or a combined MME and SGSN node. A combined MME and SGSN node may be referred to as MME/SGSN below.

A first gateway node 110a may also be configured to be connected to the RAN node 105 and also the mobility management node 108. The first gateway node 110a may be a SGW or a PGW or a combined PGW and SGW node. Such combined SGW and PGW node may be referred to as SGW/PGW 110 in the following. In some embodiments, the PGW may be co-located with a Gateway General packet radio service Support Node (GGSN) in one node and therefore referred to as PGW/GGSN in the following. In some embodiments, the SGW may be co-located with a GGSN in one node and therefore referred to as SGW/GGSN in the following.

In some embodiments, a second gateway node 110b may be configured to be connected to the first gateway node 100a. The second gateway node 100b may be a SGW or a PGW or a combined PGW and SGW node. The SGW may be a combined SGW and GGSN node and the PGW may be a combined PGW and GGSN node.

In the following, the reference number 110 is used to refer to a gateway node in general, regardless of whether it is the first gateway node 110a or the second gateway node 110b.

Table 1 below shows an overview of some example embodiments in an embodiment where there is only one gateway in the network 100, i.e. only the first gateway node 110a and not the second gateway node 110b. Note that the co-located nodes SGW/GGSN and PGW/GGSN are not included in table 1, but the skilled person would understand that a SGW may be replaced by a SGW/GGSN and that a PGW may be replaced by a PGW/GGSN.

TABLE 1

| Mobility management node 108 | First gateway node 110a |
|---|---|
| MME | SGW |
| MME | PGW |
| MME | SGW/PGW |
| SGSN | SGW |
| SGSN | PGW |
| SGSN | SGW/PGW |
| MME/SGSN | SGW |
| MME/SGSN | PGW |
| MME/SGSN | SGW/PGW |

Table 2 below shows an overview of some example embodiments in an embodiment where there are two gateways in the network 100, i.e. both a first gateway node 100a and a second gateway node 100b. Note that the SGW/GGSN and PGW/GGSN are not included in table 2, but the skilled person would understand that a SGW may be replaced by a SGW/GGSN and that a PGW may be replaced by a PGW/GGSN.

TABLE 2

| Mobility management node 108 | First gateway node 110a | Second gateway node 110b |
|---|---|---|
| MME | SGW | PGW |
| MME | PGW | SGW |
| SGSN | SGW | PGW |
| SGSN | PGW | SGW |
| MME/SGSN | SGW | PGW |
| MME/SGSN | PGW | SGW |

The communications system 100 may further comprise a NOC 115 which monitors the communications system 100 for alarms or certain conditions that may require special attention in order to avoid impact on network performance.

It should be noted that the communication links in the communications system 100 may be of any suitable kind including either a wired or wireless link. The link may use any suitable protocol depending on type and level of layer (e.g. as indicated by the Open Systems Interconnection (OSI) model) as understood by the person skilled in the art.

The method for handling overload in a communications network 100, according to some embodiments will now be described with reference to the signalling diagram depicted in FIG. 2. The method comprises the following steps, which steps may as well be carried out in another suitable order than described below.

Step 200

High network load, congestion in the network, that a server is down or blocked, that a server is associated with a failure, that the server is unreachable etc. is observed in the network 100, e.g. observed at the NOC 115 or observed at a network node such as a gateway (e.g. PGW/GGSN and/or SGW). In the following, the term overload is in the following used to cover all situations such as congestion, that a server is down or blocked, a persistent failure, that the server is unreachable etc. Overload in e.g. the Gi/SGi interface may cause congestion on the radio side created by many attempts by the UE 101. In an overload situation, throttling may be done, whereas in a congestion situation one may want to block more traffic. The load may generated by a large number of UEs 101 (e.g. M2M devices or Smartphones) trying to access a server that does not respond. The server may be e.g. an Application Server (AS) which is a server which is configured to install, operate and host applications and associated services for end users. The AS facilitates the hosting and delivery of applications which are used by multiple and simultaneously connected local or remote users. The UEs 101 tries to access the server by sending a communication service request. The UEs 101 keep repeating the request, hence causing a high network load. This may also occur when malicious access to a network may disrupt the normal operation mimicking this same behaviour.

Step 201

Information indicating blocked IP address(es) is sent from either the NOC 115 to the mobility management node 108 or from a gateway node 110 to the mobility management node 108. Communication requests associated with the blocked IP address(es) should be rejected due to the overload, congestion, failure etc. that was detected in step 200. This is illustrated with the two arrows associated with step 201 in FIG. 2.

The NOC 115 may comprise performance monitoring tools in network nodes or probes that isolates the high load towards one or a few specific IP address(es). In some embodiments, the NOC 115 sends information indicating the blocked IP address to the mobility management node 108. In one embodiment, the information indicating blocked IP address(es) may be sent from the NOC 115 in an O&M command. In another embodiment, the information indicating blocked IP address(es) may be sent by a gateway 110 to the mobility management node 108 using explicit GTP/PMIP signalling from the gateway 110, e.g. from the PGW/GGSN (via the SGW). The existing "PDN GW control of overload" may be enhanced, e.g. by enabling the PGW/GGSN to provide an IP address or IP address range. The gateway 110 may itself detect a failure condition over a period of time or via a periodic checking of a node status with e.g. keep alive messages.

With this, the mobility management node 108 is made aware that an IP address, several IP address(es) or an IP address range is under overload control An APN may be provided together with the IP address or IP address range to make the IP address unique in case overlapping IP address(es) are used e.g. for IPv4 in Evolved Packet Core (EPC).

After receipt of the blocked IP address(es), the mobility management node 108 stores the received address(es).

Step 202

The RAN node 105 sends a communication request message to the mobility management node 108. The communication request message may be sent from the UE 101 to the RAN node 105 before the RAN node 105 sends it to the mobility management node 108, i.e. the communication request is a request for communication by the UE 101. Such communication request message may be e.g. a service request message or an attach request message. The communication request may be a request for communication, from an application comprised in the UE 101, with a server in an AS where the server is associated with an IP address. It may also be described as being an attempt to access the server. The communication request message may be described as a message that may trigger establishment of a service towards an Application that the network (e.g. the NOC 115 or the gateway node 110) has identified to be blocked.

Step 203

The mobility management node 108 determines that the UE's 101 request for communication should be rejected because the UE 101 is associated with blocked IP address(es).

The IP address(es) to be blocked may need to be checked against the IP address(es) in sent and/or received IP packets. This may be done in either of the following two ways:

a) By letting the gateway 110 store the latest used IP address(es) in conveyed IP packets and do a check against the blocked IP address(es) as part of a signalling procedure at a later point in time, or b) By passing the IP address(es) to be blocked down to the gateway 110. The gateway checks each packet in real-time as it is being forwarded by the gateway 110. If a successful match of blocked and used IP address(es) occurs: the gateway 110 passes the successful result to the mobility management node 108 as part of a signaling procedure immediately or at a later point in time.

Note that a used IP address may be a used destination IP address. The used IP address 3 is the address associated with the UE 101 the previous time the UE 101 was attached or the previous time the UE 101 was in ECM connected mode. It is assumed that the UE 101 will try to connect to the same IP address again as the previous time. The used IP address may be based on an assumption that a previously used IP address at a previous communication request will be the same IP address as the UE 101 will be used in the new communication request. Thus, the used IP address is somewhat based on "statistics" or a "cache" of what IP address(es) the UE 101 has used before. In contrast a requested IP address refers to the IP address that the UE intends to use and is therefore included in the current communication request in step 202. Thus, the used IP address is not the IP address in the current communication request in step 202.

Case a)

In the a) case, the first gateway node 110a stores the last used IP destination address(es) for uplink packets forwarded by the first gateway node 110a to another gateway, e.g. the second gateway node 110b. Optionally, IP source address(es) for downlink packets may also be stored. The storage in first gateway node 110a may be activated by signaling from the mobility management node 108 to the first gateway node 110a. This may be by passing an indication at creation of the PDN Connection e.g. the Create Session Request message, or by passing an indication as part of a modification of the PDN Connection using e.g. the Modify Bearer Request message or the Modify Access Bearers Request message. The mobility management node 108 decides for which UEs 101 to activate storage based on available information about the UE 101 (e.g. IMSI, information received in a Non Access Stratum (NAS) such as UE network capabilities, subscription information received from a subscriber server, e.g. a HSS, or received from an old or previous first gateway node 110a). The mobility management node 108 may for example decide to activate storage for constrained UEs 101 having reduced radio capabilities (e.g. "category 0" UEs 101) or for UEs 101 using specific APNs. The storage may alternatively be activated by configuration in the first gateway node 110a e.g. per APN.

Case b)

In the b) case, the checking is activated by the mobility management node 108 by sending the IP address(es) to be blocked down to the first gateway node 110a. This may be done using an information element as part of the Create Session Request message, or as part of the Modify Bearer Request message or the Modify Access Bearers Request message. After receiving the IP address(es) to be blocked, the first gateway node 110a compares the IP address(es) to be blocked with the IP destination address in all IP packets conveyed uplink, e.g. from the SGW to the PGW or from the GGSN on the Gi interface to the Packet Data Network (PDN). Optionally the first gateway node 110a also compares the IP address(es) to be blocked with the IP source address in all IP packets conveyed downlink i.e. received from the second gateway node 110b to the first gateway node 110a and further conveyed to the RAN node 105, e.g. the eNB or RNC, or received on the Gi interface in the GGSN and forwarded to the SGSN or the RNC or the BSC. When the first gateway node 110a has compared and found matching IP address(es), the first gateway node 110a sets a local flag. If the local flag is set, the first gateway node 110a notifies the mobility management node 108 immediately or at a later stage. A later stage may for example be as part of the S1/Iu Release procedure e.g. as an indication in the Release Access Bearers Response message. The mobility management node 108 will then remember (e.g. by setting a flag in the UE context) that this UE 101 is communicating with an IP address to be blocked. The mobility management node 108 will then take action e.g. by rejecting the next communication request from the UE 101 optionally with a back-off timer. The mobility management node 108 may also deactivate UE bearers or deactivate the UE optionally with a back-off timer. The mobility management node 108 decides for which UEs 101 to activate the checking based on available information about the UE 101 (e.g. IMSI, information received in the NAS such as MS/UE network capabilities, subscription information received from a subscriber server or received from an old mobility management node 108). The mobility management node 108 may for example decide to activate checking for constrained UEs 101 having reduced radio capabilities (e.g. "category 0" UEs) or for UEs 101 using specific APNs. Checking may alternatively be activated by configuration in the first gateway node 110a e.g. per APN.

Figure 3:
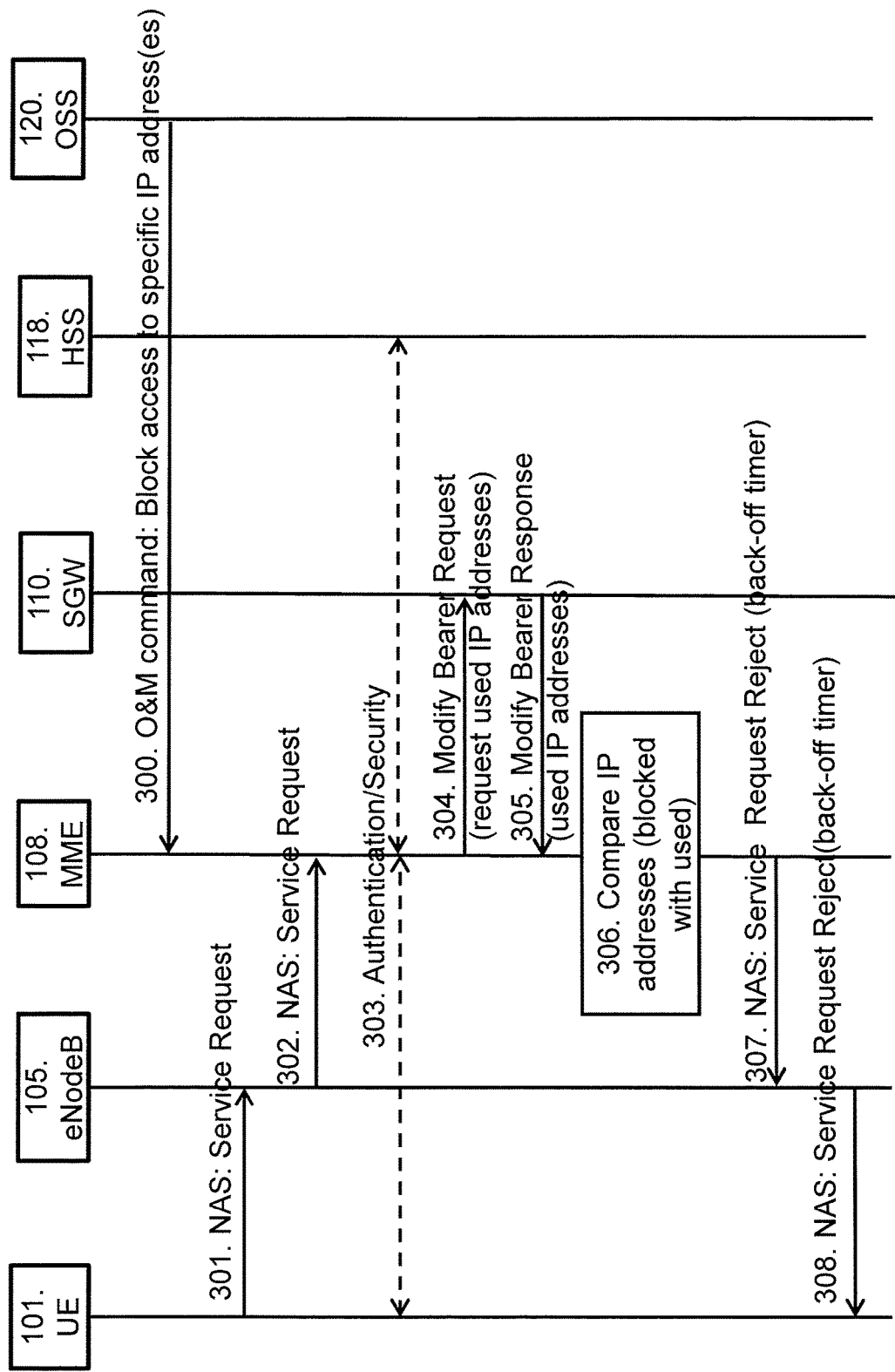
FIG. 3 is a signaling diagram illustrating embodiments of a method using coordination in the mobility management node at a UE triggered Service Request.

FIGS. 3 and 4 below illustrates examples of the a) case. FIG. 5 below gives an example of the b) case.

When the mobility management node 108 is represented by an MME and the first gateway node 110a is represented by a SGW, the MME and SGW may be co-located or integrated into one and the same node (or when traffic is passing through the SGSN e.g. when 3G Direct Tunnel feature is not used). In such embodiment, the check/comparison of used against blocked IP address(es) may be done internally in the MME or SGSN node. That is, no need to pass IP address(es) as described in the a) and b) case above.

The actions described for the first gateway node 110a above may alternatively be done in the second gateway node 110b. The signaling described above between the mobility management node 108 and the first gateway node 110a will then be extended to the second gateway node 110b by the first gateway node 110a forwarding the messages and information to/from the second gateway node 110b.

When a UE 101 requests to communicate (through a service request) and if IP address based overload control is active, the mobility management node 108 coordinates or has coordinated with the first gateway node 110a if the UE 101 has previously used the IP address(es)/range that is now under overload control. Coordination may be done by pushing the information about the latest used IP address(es) from the first gateway node 110a to the mobility management node 108 as part of the S1 Release signaling over S11 interface. Alternatively it may be done at the Service Request with mobility management node 108 requesting information indicating the IP address(es) from the first gateway node 110a before it proceeds with the service request. Yet another alternative, it can be done at the Service Request with mobility management node 108 requesting of IP address(es) from first gateway node 110a before it proceeds with the service request.

Step 204

The mobility management node 108 sends a reject message to the RAN node 105 as determined in step 203, i.e. when overload control is active.

If the UE 101 has communicated or tried to communicate with one of the IP address(es) under overload control for a predetermined period of time and for the same APN, the service request is rejected. Optionally, a back-off timer is also sent to the UE 101 in the reject message.

The network load, congestion, failure etc. will be reduced when no radio bearers need to be established for UEs 101 such as e.g. M2M devices and Smartphones that with a high probability tried to communicate with the blocked IP address(es). The load will be reduced even more if those UEs 101 will back-off and stop sending new communication requests for a period of time.

The APN may be used in combination with the IP address in the steps 210-204 above to make IP address(es) unique if overlapping IP address(es) are used to reduce possibility of wrongly rejecting access attempt towards another server not being blocked. Overlapping IP address(es) typically exists when IPv4 address(es) are used.

One aspect of the embodiments herein for the network based control of congestion/overload/failure/unreachability is how the mobility management node 108 may coordinate blocked IP address(es) with used IP address(es) in the gateway node 110 without causing a too high load on the nodes. If the mobility management node 108 were to ask the gateway node 110 for every communication request in the network, a far too high load would hit the network.

Alternative embodiments of approaches for the coordination are listed below.

1) Coordination may only be done when overload control is active in the network. This embodiment may be combined with any of the embodiments below.
2) The mobility management node 108 may only coordinate with gateway node 110 for specific UEs 101 based on available information in the mobility management node 108. This may for example be: The UEs 101 using specific APN/PDNs, the UEs 101 having a specific subscription parameter (e.g. M2M devices), the UEs 101 indicating a specific terminal capability in the NAS or S1/Iu signaling (e.g. cat-0 device i.e. constrained M2M device), etc.
3) The last used IP address(es) may be sent to mobility management 108 from the gateway 110 at S1 release. The mobility management node 108 stores the most recent IP address(es) in the mobility management node 108 e.g. in the mobility management node context. The mobility management node 108 may then coordinate internally next time (i.e. much faster).
4) The mobility management node 108 may only coordinate if the UE 101 has a high service request rate (based on collected statistics in the mobility management node 108).
5) At the O&M command to block specific IP address(es) in step 201 above, the mobility management node 108 may start a scan of all UEs 101 in the mobility management node 108 and ask the gateway nodes 110 for latest used IP address(es) for each UE 101. UEs 101 that have used a blocked/congested IP address are marked locally in the mobility management node 108 to be blocked at the next service request or other request e.g. UE 101 or network initiated dedicated bearer request.

In some embodiments, there may be a configurable value on how many times in a row the same congested IP address should have been used. If the mobility management node 108 indicates to the gateway nodes 110 to start store the destination IP address(es) after the session request message, then it should be an (operator) configurable parameter in the mobility management node 108. If the gateway node 110 stores the destination IP address(es) without being directed by the mobility management node 108, then the parameter is in the gateway node 110. If the APN is known in the gateway node 110, then the operator may want to enable the feature per APN. In current technology, the APN may be stored in the gateway node 110 to activate that feature for VoLTE only. With APN the risk for smartphones that have multiple APN capability to wrongly reject is reduced.

More detailed embodiments of the one described in FIG. 2 above will now be described with references to FIGS. 3, 4 and 5. In particular, embodiments of the cases a) and b) will be described in more detail. FIG. 3 illustrates an embodiment where the mobility management node 108 may coordinate IP address(es) with a gateway 110 (case a). FIG. 4 illustrates an embodiment where the mobility management node 108 may coordinate IP address(es) by pushing used IP address(es) from the gateway 110 to the mobility management node 108 at S1 release (case a). FIG. 5 illustrates an embodiment where the mobility management node 108 coordinates IP address(es) at an UE triggered service request and S1 release (case b). FIGS. 3, 4 and 5 are described with reference to the communications system shown in FIG. 1, where the RAN node 105 is represented by an eNodeB, the mobility management node 108 is represented by a MME, the first gateway node 110a is represented by a SGW and the second gateway node 110b is represented by a PGW. In addition, the following nodes are also seen in FIGS. 3, 4 and 5: HSS 118 and OSS 120. The HSS 118 is an example of a subscriber server. Note that any other examples of the nodes in FIG. 1 may be equally applicable to the examples used in FIGS. 3, 4 and 5.

The method for handling overload in a communications network 100, i.e. case a) according to some embodiments will now be described with reference to the signalling diagram depicted in FIG. 3. FIG. 3 illustrates overload control based on IP addresses, through coordination in the MME 108 at UE triggered Service Request ("the a) case"). The method comprises the following steps, which steps may as well be carried out in another suitable order than described below.

Step 300

Figure 2:
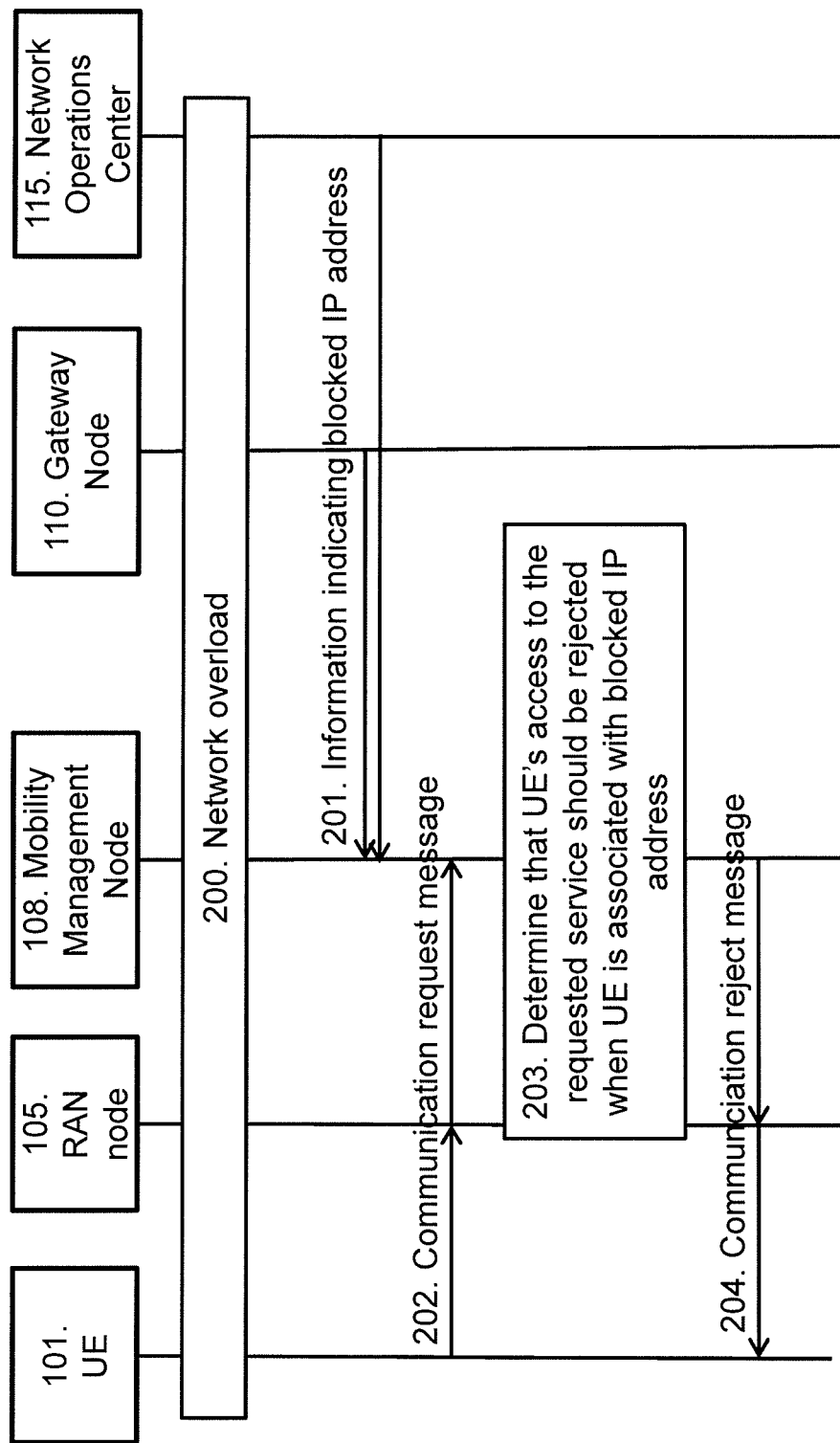
FIG. 2 is a signaling diagram illustrating embodiments of a method.

This step corresponds to step 201 in FIG. 2. High network load is identified at a Network Operation Centre 115, with a large number of UEs 101 trying to access the same IP address or range of IP address(es). An Operation & Management (O&M) Command is sent from the OSS 120 to the MMEs 108 (and possibly also SGSNs (not shown)) in the network. The O&M command may comprise a throttling of all or a percentage of all Service Requests to a specific IP address, a range of IP address(es), or a specific subset of the communication towards those IP address(es). The subset may be identified based on information in the IP header, the UDP header, the TCP header, or other protocol header. Examples of header information used for overload control are protocol number, port number, etc. The O&M command may also include one or more APNs for which the IP address(es) applies. Especially when IPv4 address(es) is used, the IP address(es) in an MME 108 may overlap hence making the APN useful. The APN in the O&M Command may be compared with the APN used by the UEs 101 of their PDN/PDP Connections. If a UE 101 uses the APN in the O&M Command the IP address/header information is checked for match to decide if overload control shall be applied. The MME 108 may store the received blocked IP address(es).

Step 301

This step corresponds to step 202 in FIG. 2. The UE 101 sends a NAS message Service Request towards the MME 108 encapsulated in an RRC message to the eNodeB 105 as defined in TS 23.401, V 12.5.0, chapter 5.3.4 or in a PDN message to the eNodeB 105 as defined in TS 23.401, V 12.5.0, chapter 5.10.2. The NAS message is an example of the communication request in FIG. 2. NAS is a functional layer between the core network and the UE 101. This layer is used to manage the establishment of communication sessions and for maintaining continuous communications with the UE 101 as it moves.

Step 302

This step corresponds to step 202 in FIG. 2. The eNodeB 105 forwards NAS message to the MME 108 as defined in TS 23.401, V12.5.0, chapter 5.3.4 and chapter 5.10.2.

Step 303

NAS authentication/security procedures are executed between the UE 101 and the MME 108, and between the MME 108 and the HSS 118, as defined in TS 23.401, V12.5.0. Step 303 is represented with dotted arrows in FIG. 3 because it represents optional procedures.

Step 304

The MME 108 sends a request to the SGW 110a to receive the used IP address(es) of the UE. The requested used IP address(es) may be the most recently used IP address(es) The request may be comprised in a modify bearer request message or a message specific for the overload control coordination. The request for used IP address(es) may be in the form of an indication or any other suitable parameter that is understood by the SGW 110a to mean that used IP address(es) should be returned to the MME 108. Such indication may also indicate that the SGW 110a should start storing used IP address(es) for future return to the MME 108.

The message sent in step 304 may also comprise an indication to the SGW 110a that is should start to store used IP address(es). Such instruction may come from the MME 108 when the MME 108 request to connect the S1-U connection, e.g. in a Modify bearer Request or a Create Bearer Request. The parameter that indicates to the SGW to start to capture and to return "used IP address(es)" may have an indication to capture and return used IP address(es) may have been passed to the SGW 110a by other means, e.g. as part of the creation of the PDN connection (CREATE SESSION REQUEST MESSAGE), another or specific modification of the bearer, or some O&M/NOC command to the SGW 110a.

Step 305

The SGW 110a returns the used IP address(es), e.g. most recently used IP address(es) to the MME 108. The used IP address(es) may be sent in an response message which may be a modify bearer response message or a message specific for the overload control coordination. The MME 108 may store the received used IP address(es) and possibly also an association between the used IP address(es) and the UE 101.

Step 306

This step corresponds to step 203 in FIG. 2. The MME 108 determines if the UE 101 which requests access to the communication service is associated with a blocked IP address by comparing the IP address(es), i.e. by comparing the used IP address(es) with the blocked IP address(es).

Step 307

This step corresponds to step 204 in FIG. 2. If the UE 101 has used the IP address(es) that are under overload control, the MME 108 rejects the service request by sending a NAS message to the UE 101.

Step 308

The eNodeB 105 forwards the NAS message to the UE 101.

Figure 4A:
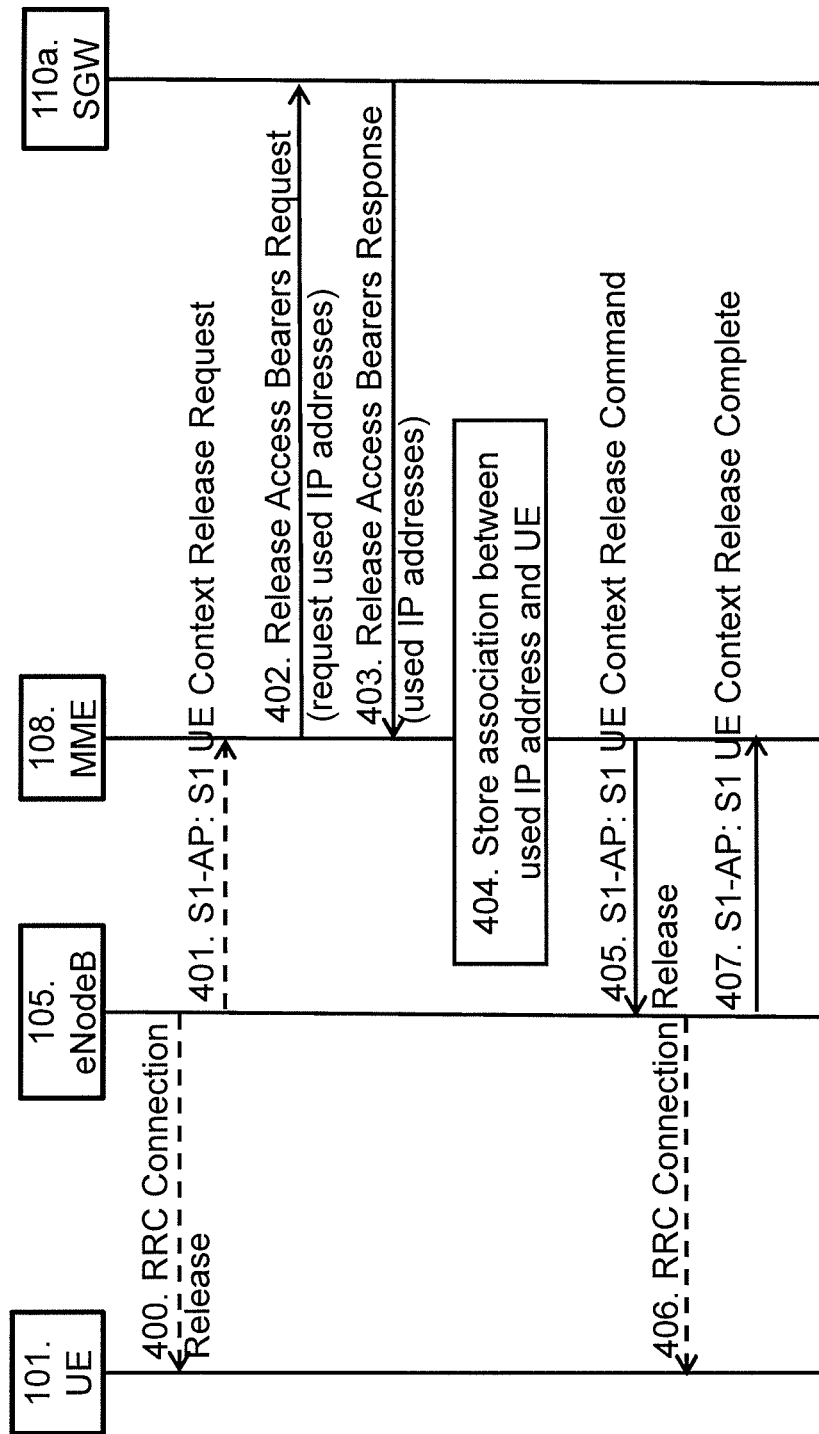
FIG. 4a is a signaling diagram illustrating embodiments of a method using coordination in the mobility management node at S1 Release and UE triggered Service Request.
Figure 4B:
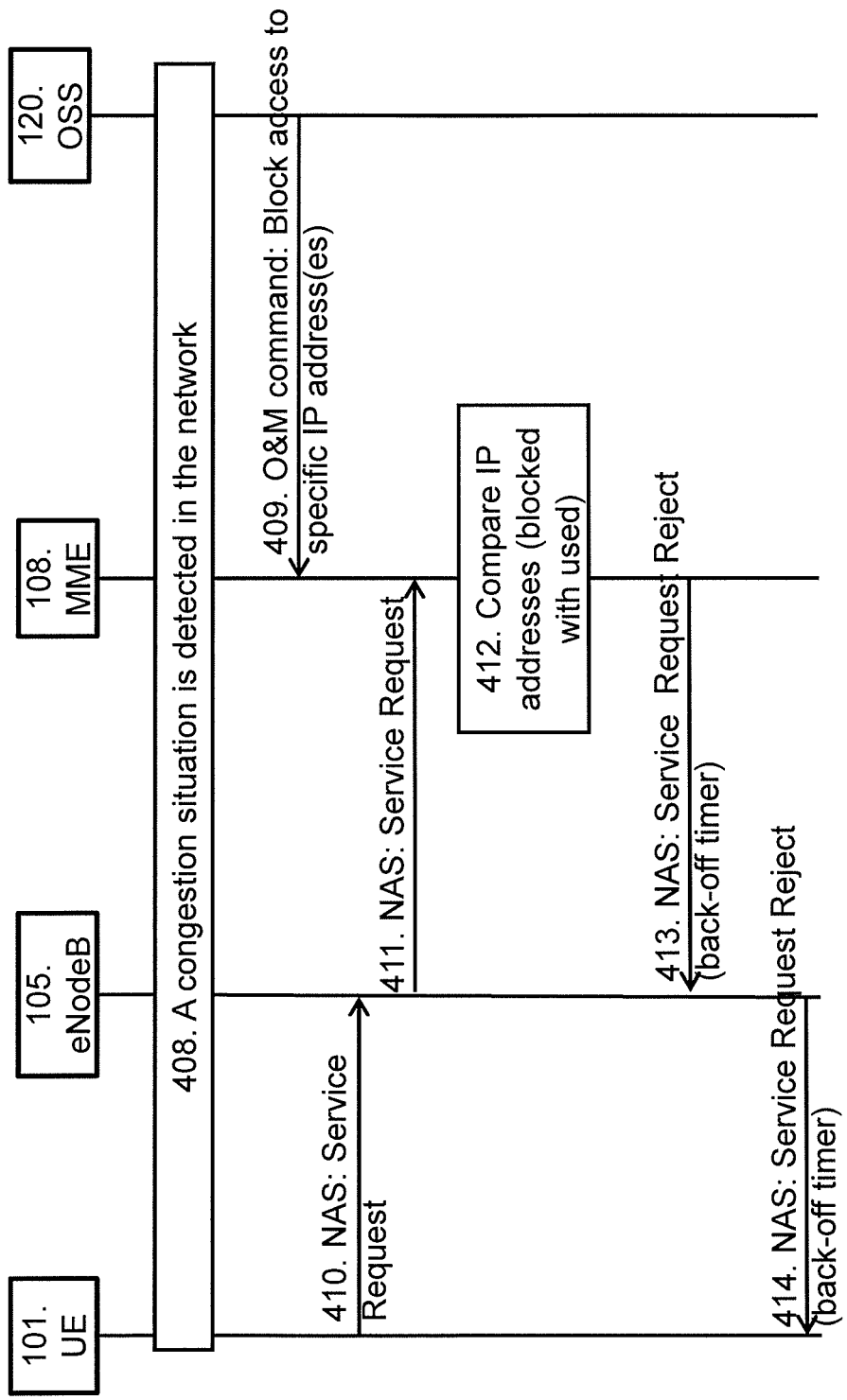

The method for handling overload in a communications network 100, i.e. case a) according to some embodiments will now be described with reference to the signalling diagram depicted in FIGS. 4a-b. FIG. 4b is a continuation of FIG. 4a. FIG. 4a comprises steps 400-407 and FIG. 4b comprises steps 408-414. FIGS. 4a-b illustrates overload control based on IP addresses, through coordination in the MME 108 at S1 Release and UE 101 triggered Service Request ("the a) case"). The method comprises the following steps, which steps may as well be carried out in another suitable order than described below.

Step 400

This step is seen in FIG. 4a. The eNodeB 105 sends a RCC Connection Release message to the UE 101. Instead of a RCC Connection Release, the message in step 400 may be a PDN connection release message. Step 400 is represented by a dotted arrow in FIG. 4a because it is an optional message.

Step 401

This step is seen in FIG. 4a. If the eNodeB 105 detects a need to release the UE's 101 signalling connection and all radio bearers for the UE 101, the eNodeB 105 sends an S1 UE Context Release Request (Cause) message to the MME 108. Step 401 is represented by a dotted arrow in FIG. 4a because it is an optional message.

Step 402

This step is seen in FIG. 4a. The MME 108 may include a parameter that indicates to the SGW 110a to return the latest used IP address(es). An optional count of max number of different IP address(es) may be included. In other words, the MME 108 sends a request for the used IP address(es) to the SGW 110a. The request may be a release access bearers request message.

The message sent in step 404 may also comprise an indication to the SGW 110a that is should start to store used IP address(es). Such instruction may come from the MME 108 when the MME 108 request to connect the S1-U connection, e.g. in a Modify bearer Request or a Create Bearer Request. The parameter that indicates to the SGW to start to capture and to return "used IP address(es)" may have an indication to capture and return used IP address(es) may have been passed to the SGW 110a by other means, e.g. as part of the creation of the PDN connection (CREATE SESSION REQUEST MESSAGE), another or specific modification of the bearer, or some O&M/NOC command to the SGW 110a.

Step 403

This step is seen in FIG. 4a. The SGW 110a sends information about the latest used IP address(es) for the UE 101 in the Release Access Bearers Response message to the MME 108. The MME 108 stores the received IP address(es). In one embodiment, only the destination IP address in uplink packets is used. In another embodiment, both uplink and downlink are monitored, that is, the destination IP address in uplink packets and the source IP address in downlink packets. Note that uplink is seen as the direction from the UE 101 to the eNodeB 105, and downlink is seen as the direction from the eNodeB 105 to the UE 101.

In a yet another embodiment, the SGW 110a forwards the request for latest use IP address(es) in step 402 to the PGW 110b (not shown in FIG. 4b). The PGW 110b monitors sent IP packets as described above and returning the latest used IP address(es) to the SGW 110a. The SGW 110a then including the used IP address(es) in the Release Access Bearers Response message.

Step 404

The MME 108 stores the used IP address(es) received in step 403 and also the association between these used IP address(es) and the UE 101. This may be stored in the UE context information in the MME 108. Then even if the UE 101 happens to detach from the network between FIGS. 4a and 4b, the previously used IP addresses would still be there when step 405 is executed and can be compared with blocked IP addresses. Thus, the used IP addresses will be kept in the MME 108 until the UE attaches again. This is different from the current technology, where the UE context may be removed when a UE 101 detaches.

Step 405

This step is seen in FIG. 4a. The MME 108 releases S1 by sending the S1 UE Context Release Command (Cause) message to the eNodeB 105.

Step 406

This step is seen in FIG. 4a. If the RRC connection or PDN connection is not already released, the eNodeB 105 sends a RRC Connection Release message to the UE 101 in Acknowledged Mode. Instead of a RCC Connection Release, the message in step 406 may be a PDN connection release message.

Once the message is acknowledged by the UE 101, the eNodeB 105 deletes the UE's 101 context.

Step 406 is represented by a dotted arrow in FIG. 4a because it is an optional message.

Step 407

This step is seen in FIG. 4a. The eNodeB 105 confirms the S1 Release by returning an S1 UE Context Release Complete (ECGI, TAI) message to the MME 108. With this, the signalling connection between the MME 108 and the eNodeB 105 for that UE 101 is released.

The steps 400 and 407 described above correspond to steps 1 to 6 as described in 3GPP TS 23.401, V12.5.0 clause 5.3.5 "S1 release procedure".

Steps 407 and 408 may be performed directly after each other, or there may be a time gap between steps 407 and 408.

Steps 408

This step is seen in FIG. 4b. A overload situation is detected in the network. This may be through O&M performance monitoring methods used at the NOC 115 or overload detection mechanisms in the MME/SGSN 108 or SGW/PGW/GGSN 110. The detection mechanisms or methods reports the IP address(es) associated with the overload situation.

Step 409

This step corresponds to step 201 in FIG. 2 and step 300 in FIG. 3. This step is seen in FIG. 4b. An Operation & Management (O&M) Command is sent from the OSS 120 to MMEs 108 (and SGSNs) in the network. The O&M command may include a throttling of all or a percentage of all Service Requests to a specific IP address, a range of IP address(es), or a specific subset of the communication towards those IP address(es). The subset may be identified based on information in the IP header, the UDP header, the TCP header, or other protocol header. Examples of header information used for overload control are protocol number, port number, etc. The O&M command may also comprise one or more APNs for which the IP address(es) applies. Especially when IPv4 address(es) is used, the IP address(es) in an SGSN/MME may overlap hence making the APN useful. The MME 108 may store the received information about the blocked IP address(es).

Alternatively the command to block specific IP address(es) may be sent by explicit GTP/PMIP signalling from the PGW/GGSN 110*b* (via SGW 110*a*). The existing "PDN GW control of overload" can be enhanced, e.g. by enabling the PGW/GGSN 110*b* to provide an IP address or IP address range.

Step 410

This step is seen in FIG. 4*b*. This step corresponds to step 301 in FIG. 3. The UE 101 sends NAS message Service Request towards the MME 108 encapsulated in an RRC message or a PDN connection release message to the eNodeB 105.

Step 411

This step corresponds to step 202 in FIG. 2 and step 302 in FIG. 3. This step is seen in FIG. 4*b*. The eNodeB 105 forwards the NAS message to the MME 108.

Step 410 and 411 corresponds to steps 9 and 10 described in 3GPP TS 23.401, V12.5.0 clause 5.3.4.1 "UE triggered Service Request".

Step 412

This step corresponds to step 203 in FIG. 2. This step is seen in FIG. 4*b*. The MME 108 compares the IP address(es) in the information about the latest used IP address(es) stored at step 403 above, with the IP address(es) received in step 409 above from the OSS 120 or from the PGW. If there is a match of IP address(es), step 413 and 414 below are executed, otherwise the service request procedure continues as described in 3GPP TS 23.401, V12.5.0 clause 5.3.2.1 "E-UTRAN Initial Attach".

Step 413

This step corresponds to step 204 in FIG. 2 and step 306 in FIG. 3. This step is seen in FIG. 4*b*. The MME 108 sends a reject on the NAS service request to the eNodeB 105. Optionally a back-off time is included. The UE 101 shall not make any subsequent service requests until the back-off time has expired.

Step 414

This step corresponds to step 308 in FIG. 3. The eNodeB 105 forwards the NAS message to the UE 101. If the optional back-off time is included, the UE 101 sets a back-off timer and does not send any subsequent service request until the back-off timer has expired.

Figure 5A:
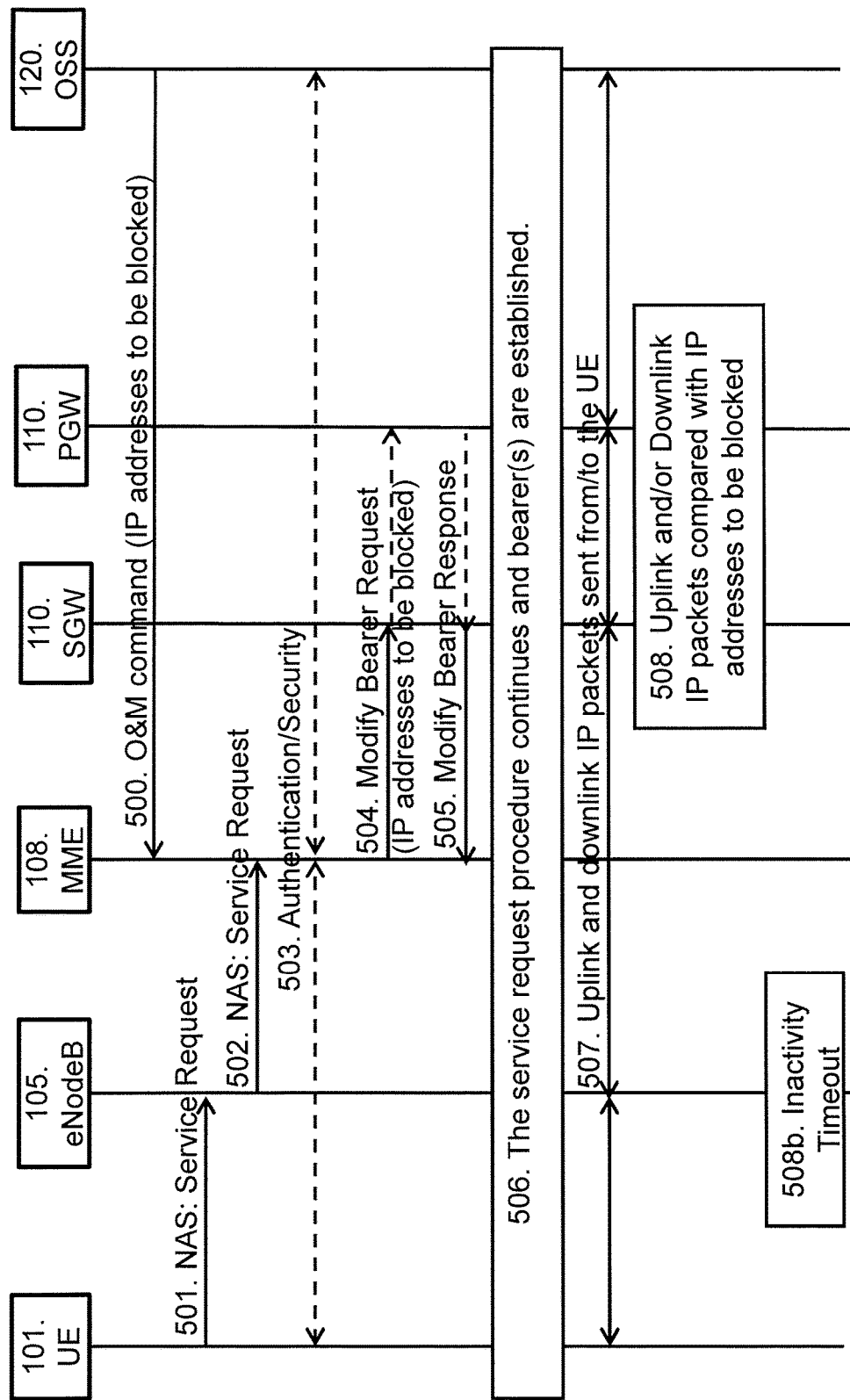
FIG. 5a is a signaling diagram illustrating embodiments of a method using coordination in a gateway at UE Triggered Service Request and S1 Release.
Figure 5B:
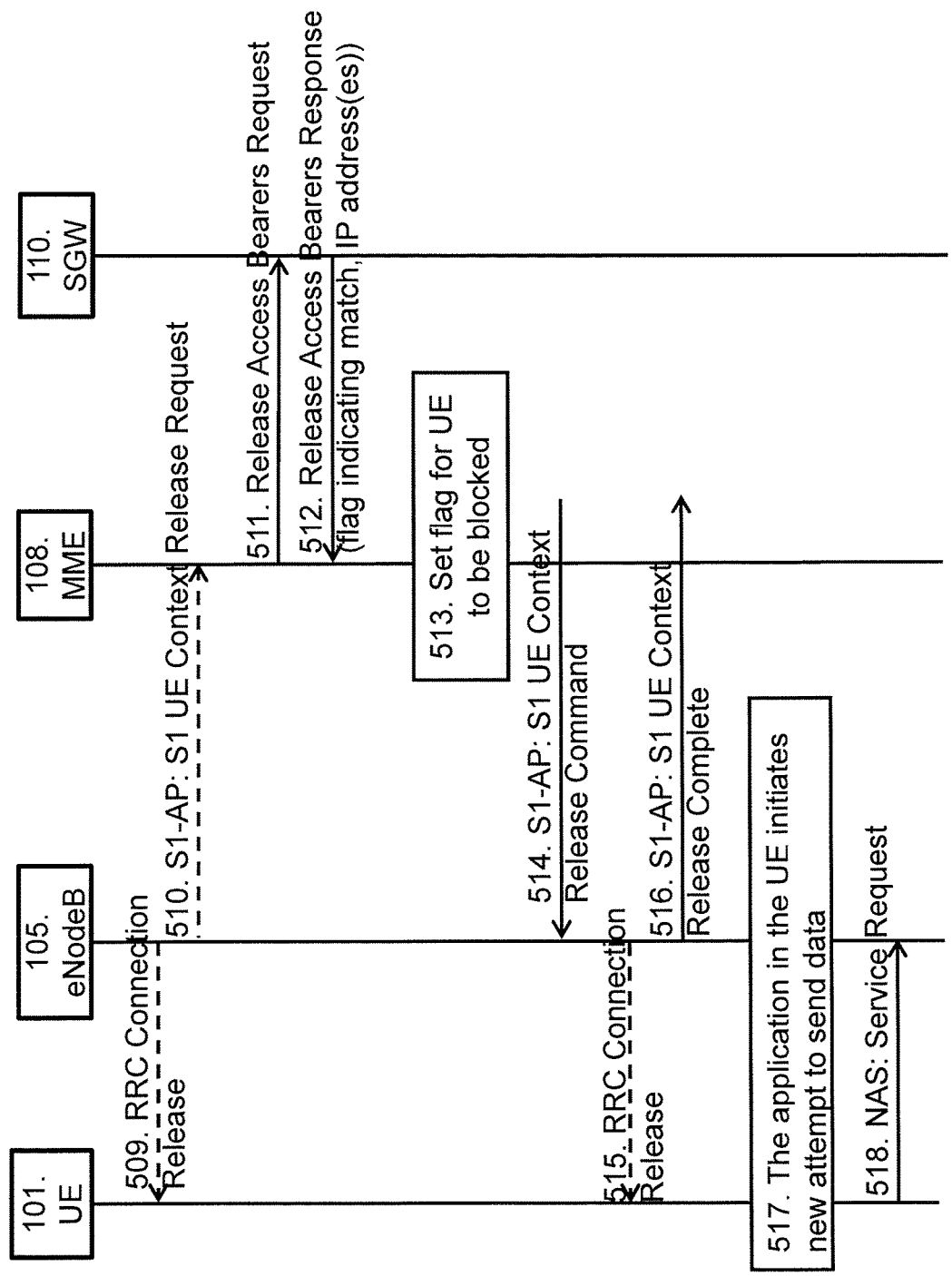
Figure 5C:
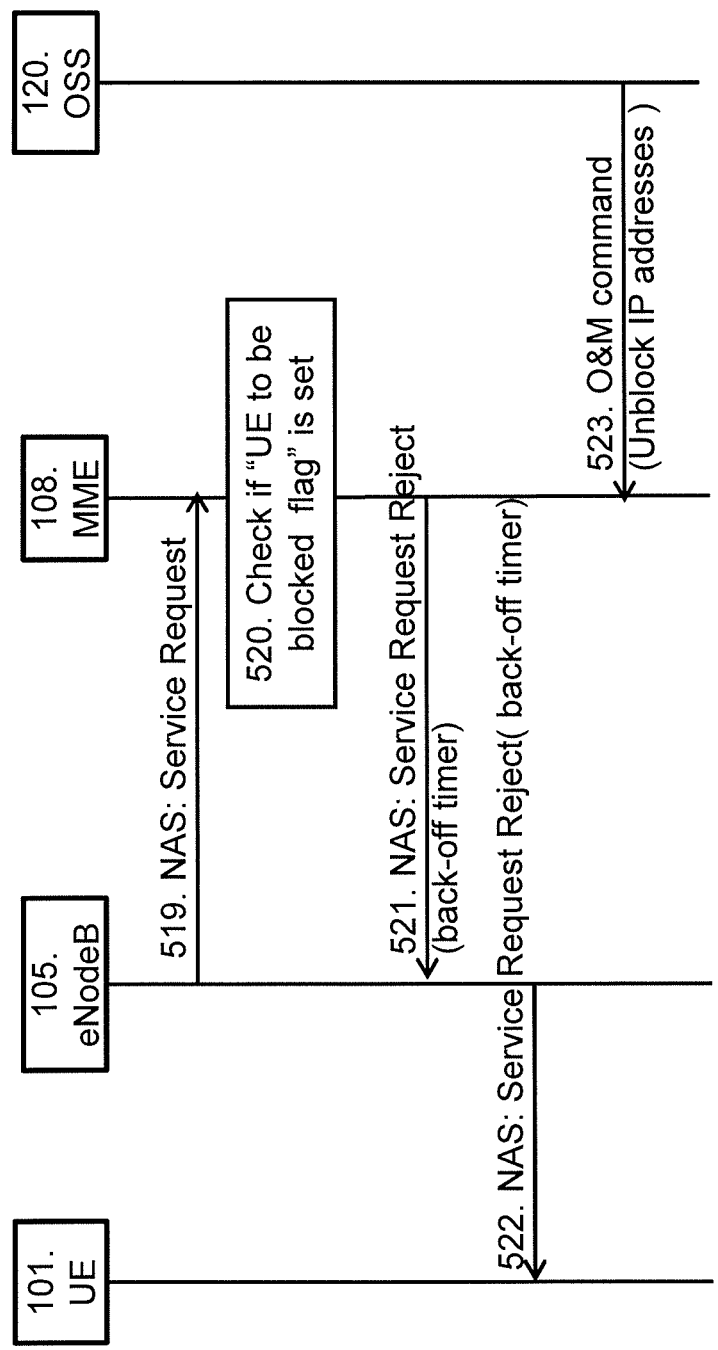
FIG. 5c is a continuation of FIG. 5b.

The method for handling overload in a communications network 100, i.e. case b) according to some embodiments will now be described with reference to the signalling diagram depicted in FIGS. 5*a, b* and *c*. FIG. 5*c* is a continuation of FIG. 5*b*, and FIG. 5*b* is a continuation of FIG. 5*a*. FIG. 5*a* comprises steps 500-508, FIG. 5*b* comprises steps 509-518 and FIG. 5*c* comprises steps 519-523. FIGS. 5*a-c* illustrates overload control based on IP addresses, through coordination in SGW 110*a* or PGW 110*b* at a UE 101 triggered service request and S1 release ("the b) case"). The method comprises the following steps, which steps may as well be carried out in another suitable order than described below:

Step 500

This step is seen in FIG. 5*a*. This step corresponds to step 201 in FIG. 2, step 300 in FIG. 3 and step 409 in FIG. 4*b*. An O&M command is sent from the OSS 120 to MMEs 108 (and SGSNs) in the network including information about IP address(es) to be blocked. The O&M command may include a throttling of all or a percentage of all Service Requests to a specific IP address, a range of IP address(es), or a specific subset of the communication towards those IP address(es). The subset is identified based on information in the IP header, the UDP header, the TCP header, or other protocol header.

Examples of header information used for overload control are protocol number, port number, etc. The O&M command may also include one or more APNs for which the IP address(es) applies. Especially when IPv4 address(es) are used, the IP address(es) in an SGSN/MME 108 may overlap hence making the APN useful. The MME 108 may store the received information about the blocked IP address(es).

Alternatively the command to block specific IP address(es) is sent by explicit GTP/PMIP signalling from the PGW/GGSN 110*b* (via SGW 110*a*) (not shown in FIG. 5*a*). The existing "PDN GW control of overload" can be enhanced, e.g. by enabling the PGW/GGSN 110*b* to provide an IP address or IP address range.

Step 501

This step is seen in FIG. 5*a*. This step corresponds to step 301 in FIG. 3 and step 410 in FIG. 4*a*. The UE 101 sends a Non Access Stratum (NAS) message Service Request towards the MME 108 encapsulated in an RRC message or a PDN connection message to the eNodeB 105 as defined in TS 23.401, V12.5.0, clause 5.3.4.1 "UE triggered Service Request". The Service Request message is associated with an application in the UE 101 trying to send data.

Step 502

This step is seen in FIG. 5*a*. This step corresponds to step 302 in FIG. 3 and step 411 in FIG. 4*b*. The eNodeB 105 forwards NAS message in step 501 to MME 108 as defined in TS 23.401, V12.5.0. The Service Request message forwarded to the MME 108 is associated with an application in the UE 101 trying to send data.

Step 503

This step is seen in FIG. 5*a*. This step corresponds to step 303 in FIG. 3. NAS authentication/security procedures are executed between the UE 101 and the MME 108, and between the MME 108 and the HSS 118, as defined in TS 23.401. Step 503 is represented by a dotted arrow in FIG. 5*a* because it is an optional message.

Step 504

This step is seen in FIG. 5*a*. The MME 108 sends a modify bearer request message to the SGW 110*a*. The request message may comprise information about IP address(es) to be blocked, i.e. the information received in step 500 above. The SGW 110*a* may forward this request comprising the information to the PGW 110*b* (indicated with a dotted arrow in FIG. 5*a*). The SGW 110*a* may store the received information about the used IP address(es). In case the SGW 110*a* has forwarded the information to the PGW 110*b*, the PGW 110*b* may also store the information about used IP address(es).

Information about IP address(es) to be blocked, received by MME in step 500, is included as an information element in the Modify Bearer Request message or Modify Access Bearers Request message. The SGW 110*a* stores the information about of IP address(es) to be blocked (and associated APN if included). In an alternative embodiment, the coordination/check is done in the PGW 110*b*, and then the SGW 110*a* forwards the information about of IP address(es) to be blocked (and APN if present) to the PGW 110*b*. A Modify Bearer Request message or Modify Access Bearers Request message is sent to PGW 110*b* conveying just the information about of IP address(es) to be blocked. The PGW 110*b* stores the information about IP address(es) to be blocked.

Step 505

This step is seen in FIG. 5*a*. The SGW 110*a* returns a modify bearer response message to the MME 108. If the SGW 110*a* forwarded the request to PGW 110*b*, the PGW 110*b* may send a response to the SGW 110*a* before the SGW 110*a* sends (i.e. forwards) the response to the MME 108.

Steps 501-505 is similar to a service request procedure in step 1 to 6 as described in 3GPP TS 23.401, V12.5.0 clause 5.3.4.1 "UE triggered Service Request", except for the difference specified in step 504 above.

Step 506

This step is seen in FIG. 5*a*. The service request procedure continues and bearer(s) are established.

Step 507

This step is seen in FIG. 5*a*. Packets are sent (uplink) and received (downlink) by the UE 101 and conveyed by the 3GPP network to/from their destinations.

Step 508

This step is seen in FIG. 5*a*. For each uplink GTP-U packet that is received by the SGW 110*a*, the SGW 110*a* compares the IP destination address in the encapsulated IP packet with the IP address(es) in the information about IP address(es) to be blocked, that was received by the SGW in step 504. Optionally the comparison is also made for each downlink packet, then comparing the IP source address in the encapsulated IP packet with the information about IP address(es) to be blocked. In case the SGW 110*a* finds a matching IP address, the SGW/GGSN 110*a* sets a local flag e.g. "match found" or "UE communicates with blocked server", in the Bearer context or UE context of the SGW 110*a*. In this example the SGW 110*a* will at a later stage convey this information to the MME 108, e.g. in the S1 Release i.e. Release Access Bearers Response message. An information element or parameter is added to the existing message indicating "match found" or "UE communicates with blocked server" to the MME 108. The SGW 110*a* may also include which blocked IP address(es) was used in communication to/from the UE 101. These latter IP address(es) may be used later by the MME 108 to unblock the UE 101 when the overload situation ceases. After a match has been found, the SGW 110*a* may optionally stop checking for further matches.

If the local flag is set, the SGW/GGSN 110*a* notifies the MME/SGSN 108 immediately or at a later stage. A later stage may for example be as part of the S1/Iu Release procedure e.g. as an indication in the Release Access Bearers Response message.

In an alternative embodiment as of second part of step 504, it is the PGW 110*b* who checks the IP address(es). A difference compared to the SGW 110*a* handling described above, is that when the PGW 110*b* has found a match, it may immediately or after some delay, sends a PGW 110*b* initiated Update Bearer Request to the SGW 110*a*. An information element or parameter is added to the existing Update Bearer Request message indicating "match found" or "UE communicates with blocked server" to the SGW 110*a*. The PGW 110*b* may also include which blocked IP address(es) was used in communication to/from the UE 101. The SGW 110*a* stores the received information and coveys the information to the MME 108 later as part of the S1/Iu Release as described in the paragraph above.

Step 508*b*

This step is seen in FIG. 5*a*. An inactivity timeout takes place in the eNodeB 105, i.e. there has not been any activity between the UE and the eNodeB 105 for a predetermined time period.

Step 509

This step is seen in FIG. 5*b*. This step corresponds to step 400 in FIG. 4*a*. The eNodeB 105 sends a RCC Connection Release message to the UE 101. Instead of a RCC Connection Release, the message in step 509 may be a bearer release such as e.g. PDN connection release message. With a bearer release, the MME 108 then ensures that the UE 101 does not trigger a PDN connection towards a blocked IP address until the overload is over. Step 509 is represented by a dotted arrow in FIG. 5*b* because it is an optional message.

Step 510

This step is seen in FIG. 5*b*. This step corresponds to step 401 in FIG. 4*a*. If the eNodeB 105 detects a need to release the UE's 101 signalling connection and all radio bearers for the UE 101, the eNodeB 105 sends an S1 UE Context Release Request (Cause) message to the MME 108. Step 510 is represented by a dotted arrow in FIG. 5*b* because it is an optional message.

The steps illustrated in FIG. 5*b* describes a release procedure starting with the RRC release message. However, a bearer release procedure is equally applicable. In a bearer release procedure, the MME 108 ensures that the UE 101 does not trigger a PDN connection towards such APN until the overload is over.

Step 511

This step is seen in FIG. 5*b*. The MME 108 sends a release access bearer request to the SGW 110*a*.

Step 512

This step is seen in FIG. 5*b*. The SGW 110*a* includes an indication "match found" or "UE communicates with blocked server" in the Release Access Bearers Response message sent to the MME 108. Information about of matching IP address(es) may also be included.

Step 513

This step is seen in FIG. 5*b*. The MME 108 stores the received information from step 512 and sets a flag in a UE context e.g. the MM Context that "match found" or "UE communicates with blocked server". The MME 108 will use this later to block subsequent communication requested by the UE 101.

Step 514

This step is seen in FIG. 5*b*. This step corresponds to step 405 in FIG. 4*a*. The MME 108 releases S1 by sending the S1 UE Context Release Command (Cause) message to the eNodeB 105.

Step 515

This step is seen in FIG. 5*b*. This step corresponds to step 406 in FIG. 4*a*. If the RRC connection or PDN connection is not already released, the eNodeB 105 sends a RRC Connection Release message to the UE 101 in Acknowledged Mode. Once the message is acknowledged by the UE 101, the eNodeB 105 deletes the UE's 101 context. Instead of a RCC Connection Release, the message in step 515 may be a PDN connection release message. Step 515 is represented by a dotted arrow in FIG. 5*b* because it is an optional message.

Step 516

This step is seen in FIG. 5*b*. This step corresponds to step 407 in FIG. 4*a*. The eNodeB 105 confirms the S1 Release by returning an S1 UE Context Release Complete (ECGI, TAI) message to the MME 108. With this, the signalling connection between the MME 108 and the eNodeB 105 for that UE 101 is released.

A full S1 Release procedure is executed in step 509 to 5016 similar to the one described in 3GPP TS 23.401, V12.5.0 clause 5.3.5 "S1 release procedure", except for the difference specified in step 512 and 513.

Step 517

This step is seen in FIG. 5*b*. The application in the UE 101 initiates a new attempt to send data. The application is the same application which the service request in step 501 and step 502 is related to.

Step 518

This step is seen in FIG. 5*b*. This step corresponds to step 301 in FIG. 3, step 410 in FIG. 4*b* and step 501 in FIG. 5*a*. The UE 101 sends NAS message Service Request towards the MME 108 encapsulated in an RRC message or a PDN message to the eNodeB 105.

Step 519

This step is seen in FIG. 5*c*. This step corresponds to step 202 in FIG. 2, step 302 in FIG. 3 and step 411 in FIG. 4*b*. The eNodeB 105 forwards the NAS message to the MME 108.

Step 520

This step is seen in FIG. 5*c*. This step corresponds to step 203 in FIG. 2. When the NAS Service Request is received in the MME 108, the MME 108 checks if the "match found" or "UE communicates with blocked server" flag is set in the UE context e.g. the MM Context of the UE 101. If so, the Service Request procedure is aborted.

Step 512

This step is seen in FIG. 5*c*. This step corresponds to step 204 in FIG. 2, step 306 in FIG. 3 and step 413 in FIG. 4*b*. A NAS Service Request Reject message is sent back to the UE 101. A back-off timer may optionally be included in the message. The MME 108 sets the back-off timer for example to an appropriate value when the overload situation is expected to be over.

Step 522

This step is seen in FIG. 5*c*. This step corresponds to step 308 in FIG. 3 and step 414 in FIG. 4*b*. The eNodeB 105 forwards the NAS PDU with the Service Request Reject message and optional back-off timer to the UE 101.

Steps 518 to 522 are similar to the steps as described in 3GPP TS 23.401, V12.5.0 clause 5.3.4.1 "UE triggered Service Request", with differences as indicated above.

Step 523

This step is seen in FIG. 5*c*. At some point when the overload situation in the network is over and/or the server(s) with the blocked IP address(es) are reachable again, the NOC 115 may release the blocking of the server. The OSS 118 then sends an O&M command to the MMEs 108 and SGSNs in the network. Information about IP address(es) to unblock may be included. The MME 108 and SGSN that receives this command, scans all their local UE contexts (e.g. MM Context) and clears all "match found"/"UE communicates with blocked server" flags and clears any information about associated IP address(es) that were blocked.

Figure 6:
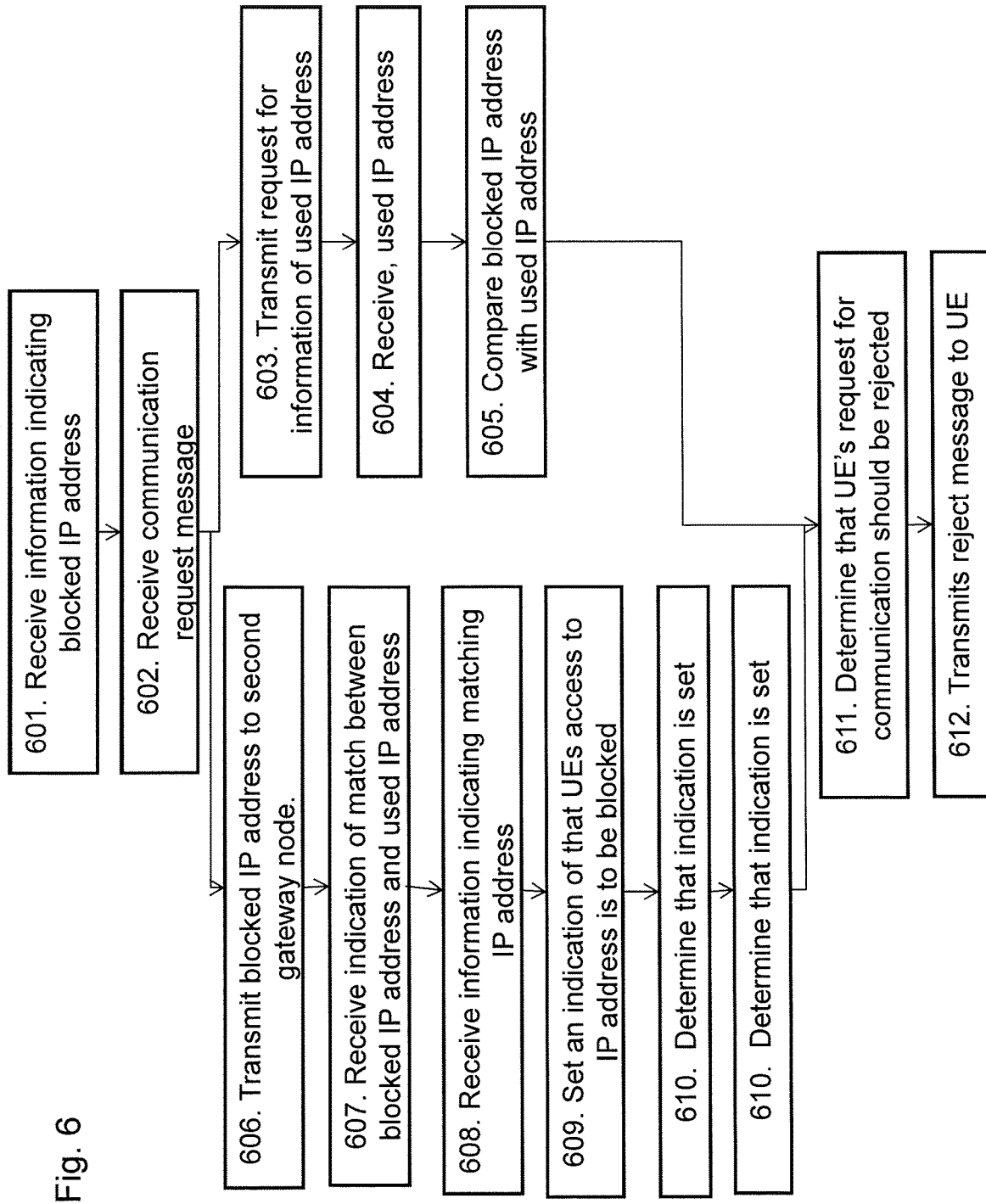
FIG. 6 is a flow chart illustrating embodiments of a method in a mobility management node.

The method described above will now be described seen from the perspective of the mobility management node 108. FIG. 6 is a flowchart describing the present method in the mobility management node 108 for handling overload in a communications network 100. The mobility management node 108 may be a MME, or a SGSN, or a combined SGSN and MME node. The method comprises the following steps to be performed by the mobility management node 108, which steps may be performed in any suitable order than described below:

Step 601

This step corresponds to step 201 in FIG. 2, step 300 in FIG. 3, step 409 in FIG. 5*b*, and step 500 in FIG. 5*a*. When overload in the communications network 100 has been detected, the mobility management node 108 receives information indicating at least one blocked IP address to which access should be blocked.

The information indicating at least one blocked IP address to which access should be blocked may be received from a NOC 115 or a gateway 110, e.g. the first gateway node 110*a* or the second gateway node 110*b*. In some embodiments, access to least one blocked IP address should be blocked because a server associated with the blocked IP address is overloaded.

Step 602

This step corresponds to step 202 in FIG. 2, step 302 in FIG. 3, step 411 in FIG. 4b, step 502 in FIG. 5a and step 519 in FIG. 5c. The mobility management node 108 receives a communication request message from a UE 101 via a RAN node 105. The communication request message is a request for communication by the UE 101. The communication request message may be a service request message or an attach request message.

Step 603

This step corresponds to step 304 in FIG. 3 and step 402 in FIG. 4a. In some embodiments, the mobility management node 108 transmits, to a first gateway node 110a, a request message for information of at least one used IP address of IP packets which has been previously sent by the UE 101. The first gateway node 110a may be a SGW, or a PGW or a combined SGW and PGW node.

What is sent to the first gateway node 110a may be as simple as one indication i.e. a one-bit flag (e.g. meaning "please return the collected/used IP addresses" or in the alternative implementation for the indication done in some earlier message "please start to collect IP addresses").

In some embodiments, the request for information of at least one used IP address may be sent to a second gateway node 110b, via the first gateway node 110a (i.e. the first gateway node 110a forwards the request to the second gateway node 110b). The second gateway node 110b may therefore perform the detection/capturing of used IP addresses instead of the first gateway node 110a.

Step 604

This step corresponds to step 305 in FIG. 3 and step 403 in FIG. 4a. In some embodiments, the mobility management node receives, from the first gateway node 110a, a response message comprising information of at least one used IP address. The at least one used IP address may be received by the mobility management node 108 from the first gateway node 110a as part of a Non Access Stratum, NAS, Service Request procedure, as part of an S1 Release procedure, as part of a Detach procedure or as part of a Delete Packet Data Network, PDN, Connection procedure.

In some embodiments, the mobility management node 108 receives the response message from the second gateway node 110b via the first gateway node 110a.

Step 605

This step corresponds to step 306 in FIG. 3 and step 412 in FIG. 4b. In some embodiments, the mobility management node 108 compares the at least one blocked IP address with the at least one used IP address. The UE 101 may be associated with a blocked IP address when the comparison results in that there is a match between at least one blocked IP address and at least one used IP address.

Step 606

This step corresponds to step 504 in FIG. 5a. In some embodiments, the mobility management node 108 transmits the received information indicating at least one blocked IP address to a second gateway node 110b. The second gateway node 110b may be a SGW, or a PGW or a combined SGW and PGW node.

Step 607

This step corresponds to step 512 in FIG. 5b. In some embodiments, the mobility management node 108 receives, from the second gateway node 110b, information indicating that there is a match between at least one blocked IP address and at least one used IP address. The used IP address is of an IP packet which has previously been sent by the UE 101.

Step 608

This step corresponds to step 512 in FIG. 5b. In some embodiments, the mobility management node 108 receives, from the second gateway node 110b, information indicating the matching IP address.

Step 609

This step corresponds to step 513 in FIG. 5b. In some embodiments, the mobility management node 108 sets an indication indicating that the UEs 101 access to IP address is to be blocked.

Step 610

This step corresponds to step 520 in FIG. 5c. In some embodiments, the mobility management node 108 determines that the indication indicating that the UE 101 is to be blocked is set. The UE 101 is associated with a blocked IP addresses when the indication is set.

Step 611

This step corresponds to step 203 in FIG. 2, step 306 in FIG. 3, step 412 in FIG. 4b, step 513 in FIG. 5b and step 520 in FIG. 5c. The mobility management node determines that the UE's request for communication should be rejected when the UE is associated with a blocked IP address.

Step 612

This step corresponds to step 204 in FIG. 2, step 307 in FIG. 3, step 413 in FIG. 4b and step 521 in FIG. 5c. In some embodiments, the mobility management node transmits, to the UE via the RAN node, a reject message to reject the UE's 101 requested communication as determined in step 611, i.e. when overload control is active.

In some embodiments, the information indicating at least one blocked IP is received before transmission of the request for information indicating at least one used IP address to the first gateway node 110. In other embodiments, the request for information indicating at least one used IP address is transmitted to the first gateway node 110 before receipt of the information indicating at least one blocked IP address.

A first computer program may comprise instructions which, when executed on at least one processor, cause the at least one processor to carry out the method according as described in FIGS. 2-6. A first carrier may comprise the first computer program. The first carrier may be one of an electronic signal, optical signal, radio signal or computer readable storage medium.

Figure 7:
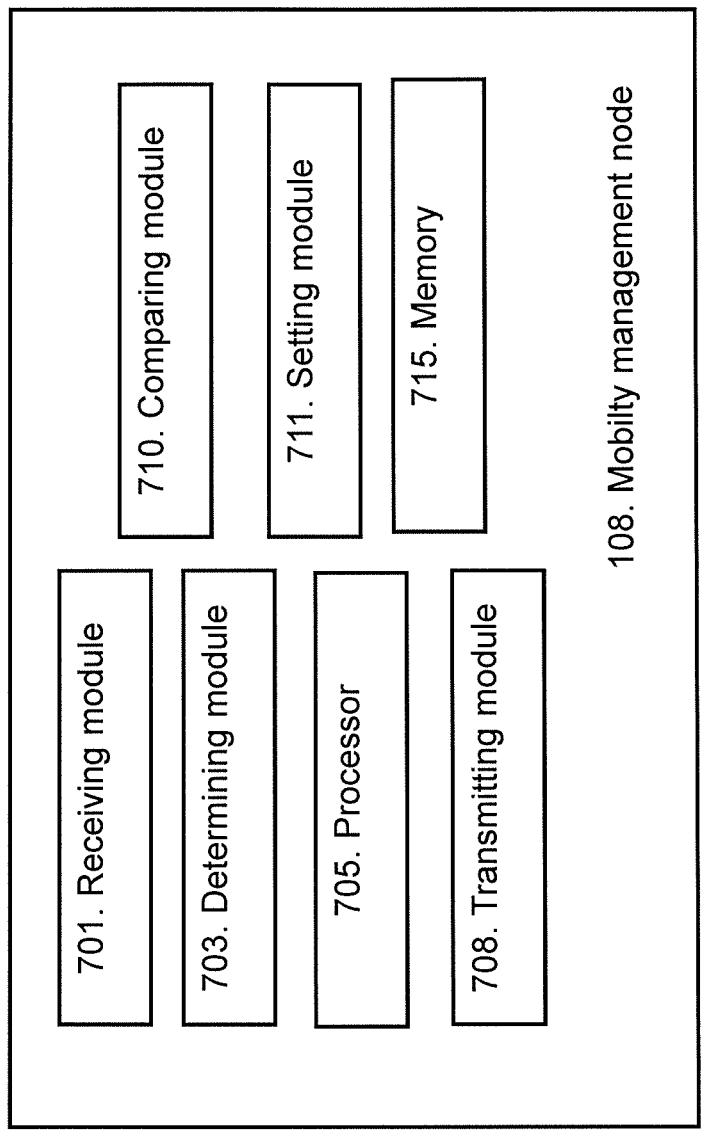
FIG. 7 is a block diagram illustrating embodiments of a mobility management node.

To perform the method steps shown in FIG. 6 for handling overload in a communications network 100, the mobility management node 108 comprises an arrangement as shown in FIG. 7. The mobility management node 108 may be a MME or a SGSN or a combined SGSN and MME node.

The mobility management node 108 is configured to, e.g. by means of a receiving module 701, when overload in the communications network 100 has been detected, receive information indicating at least one blocked IP address to which access should be blocked. The receiving module 701 may also be referred to as a receiving unit, a receiving means, a receiving circuit, means for receiving or an input unit. The receiving module 701 may be a receiver, a transceiver etc. The receiving module may be a wireless receiver of the mobility management node 108 of a wireless or fixed communications system. The information indicating at least one blocked IP address to which access should be blocked may be received from a NOC 115 or a gateway 110, e.g. the first gateway 110a or the second gateway 110b.

The mobility management node 108 is configured to, e.g. by means of the receiving module 701, receive a communication request message from a UE 101 via a RAN node 105. The communication request message is a request for communication by the UE 101. The communication request message may be a service request message or an attach request message.

The mobility management node 108 is configured to, e.g. by means of a determining module 703, determine that the UE's 101 request for communication should be rejected when the UE 101 is associated with a blocked IP address. The determining module 703 may also be referred to as a determining unit, a determining means, a determining circuit or means for determining. The determining module 703 may be a processor 705 of the mobility management node 108.

The mobility management node 108 may be configured to, e.g. by means of a transmitting module 708, transmit, to the UE 101 via the RAN node 105, a reject message to reject the UE 101 access to the requested service as determined, i.e. when overload control is active. The transmitting module 708 may also be referred to as a transmitting unit, a transmitting means, a transmitting circuit, means for transmitting or an output unit. The transmitting module 708 may be a transmitter, a transceiver etc. The transmitting module 708 may be a wireless transmitter of the mobility management node 108 of a wireless or fixed communications system.

The mobility management node 108 may be configured to, e.g. by means of the transmitting module 708, transmit, to a first gateway node 110a, a request message for information of at least one used IP address of IP packets which has been previously sent by the UE 101. The first gateway node 110a may be a SGW or a PGW or a combined SGW and PGW node.

The mobility management node 108 may be configured to, e.g. by means of the receiving module 701, receive, from the first gateway node 110a, a response message comprising information of at least one used IP address. The at least one used IP address is received by the mobility management node 108 from the first gateway node 110a as part of a Non Access Stratum, NAS, Service Request procedure, as part of an S1 Release procedure, e.g a Release Access Bearers Request message and a Release Access Bearer Response message, or as part of a Detach procedure or as part of a Delete Packet Data Network, PDN, Connection procedure, e.g. using a Delete Session Request message and a Delete Session Response message.

The mobility management node 108 may be configured to, e.g. by means of a comparing module 710, compare the at least one blocked IP address with the at least one used IP address. The UE 101 is associated with a blocked IP address when the comparison results in that there is a match between at least one blocked IP address and at least one used IP address. The comparing module 710 may also be referred to as a comparing unit, a comparing means, a comparing circuit or means for comparing. The comparing module 710 may be the processor 705 of the mobility management node 108.

The mobility management node may be further configured to, e.g. by means of the transmitting module 708, transmit the received information indicating at least one blocked IP address to a second gateway node 110b. The second gateway node 110b may be a SGW or a PGW or a combined SGW and PGW node.

The mobility management node may be further configured to, e.g. by means of the receiving module 701, receive, from the second gateway node 110b, information indicating that there is a match between at least one blocked IP address and at least one used IP address. The used IP address is of an IP packet which has previously been sent by the UE 101.

The mobility management node 108 may be further configured to, e.g. by means of the receiving module 701, receive, from the second gateway node 110b, information indicating the matching IP address.

The mobility management node 108 may further configured to, e.g. by means of a setting module 711, set an indication indicating that the UE 101 is to be blocked. The setting module 711 may also be referred to as a setting unit, a setting means, a setting circuit or means for setting. The setting module 711 may be the processor 705 of the mobility management node 108.

The mobility management node 108 may be further configured to, e.g. by means of the determining module 703, determine that the indication indicating that the UE 101 is to be blocked is set. The UE 101 is associated with a blocked IP addresses when the indication is set.

The mobility management node 108 may further comprise a memory 715 comprising one or more memory units. The memory 715 is arranged to be used to store data, received data streams, used IP address(es), blocked IP address(es), indications, flags, request messages, response messages, threshold values, time periods, configurations, schedulings, and applications to perform the methods herein when being executed in the mobility management node 108.

Those skilled in the art will also appreciate that the receiving module 701, the determining module 703, the transmitting module 708, the comparing module 710 and the setting module 711 described above may refer to a combination of analog and digital circuits, and/or one or more processors configured with software and/or firmware, e.g. stored in a memory, that when executed by the one or more processors such as the processor 570 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 8:
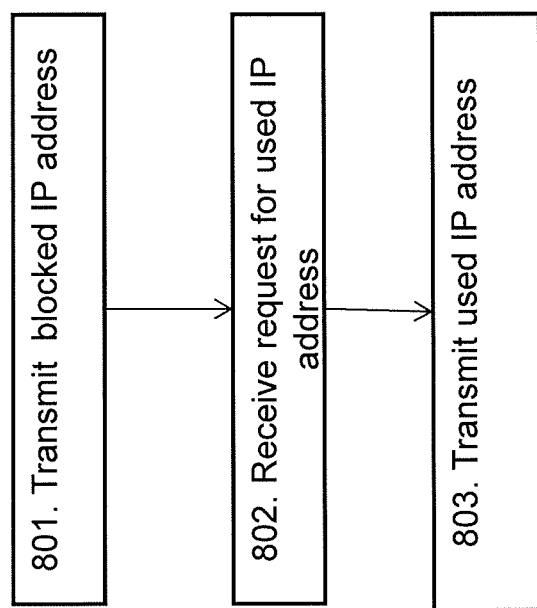
FIG. 8 is a flow chart illustrating embodiments of a method in a first gateway node.

The method described above will now be described seen from the perspective of the first gateway node 110. FIG. 8 is a flowchart describing the present method in the first gateway node 110 for handling overload in a communications network 100. The first gateway node 110a may be a SGW or a PGW or a combined SGW and PGW node. The method comprises the following steps to be performed by the first gateway node 110, which steps may be performed in any suitable order than described below:

Step 801

This step corresponds to step 201 in FIG. 2, step 300 in FIG. 3, step 409 in FIG. 4b and step 500 in FIG. 5a. In some embodiments, when overload in the communications network 100 has been detected, the first gateway node 110a transmits, to the mobility management node 108 information indicating at least one blocked Internet Protocol, IP, address to which access should be blocked. The mobility management node 108 may be a MME or a SGSN or a combined SGSN and MME node. In some embodiments, access to least one blocked IP address should be blocked because a server associated with the blocked IP address is overloaded.

Step 802

This step corresponds to step 304 in FIG. 3 and step 402 in FIG. 4a. The first gateway node 110a receives, from a mobility management node 108, a request message for information of at least one used IP address of IP packets which has been previously sent by the UE 101.

Step 803

This step corresponds to step 305 in FIG. 3 and step 403 in FIG. 4. The first gateway node 110a transmits, to the mobility management node 108, a response message comprising information of at least one used IP address.

The at least one used IP address may be transmitted to the mobility management node 108 from the first gateway node 110a as part of a Non Access Stratum, NAS, Service Request procedure, as part of an S1 Release procedure, as part of a Detach procedure or as part of a Delete Packet Data Network, PDN, Connection procedure.

A second computer program may comprise instructions which, when executed on at least one processor, cause the at least one processor to carry out the method as described in FIGS. 2-5 and 8. A second carrier may comprise the second computer program. The second carrier may be one of an electronic signal, optical signal, radio signal or computer readable storage medium.

Figure 9:
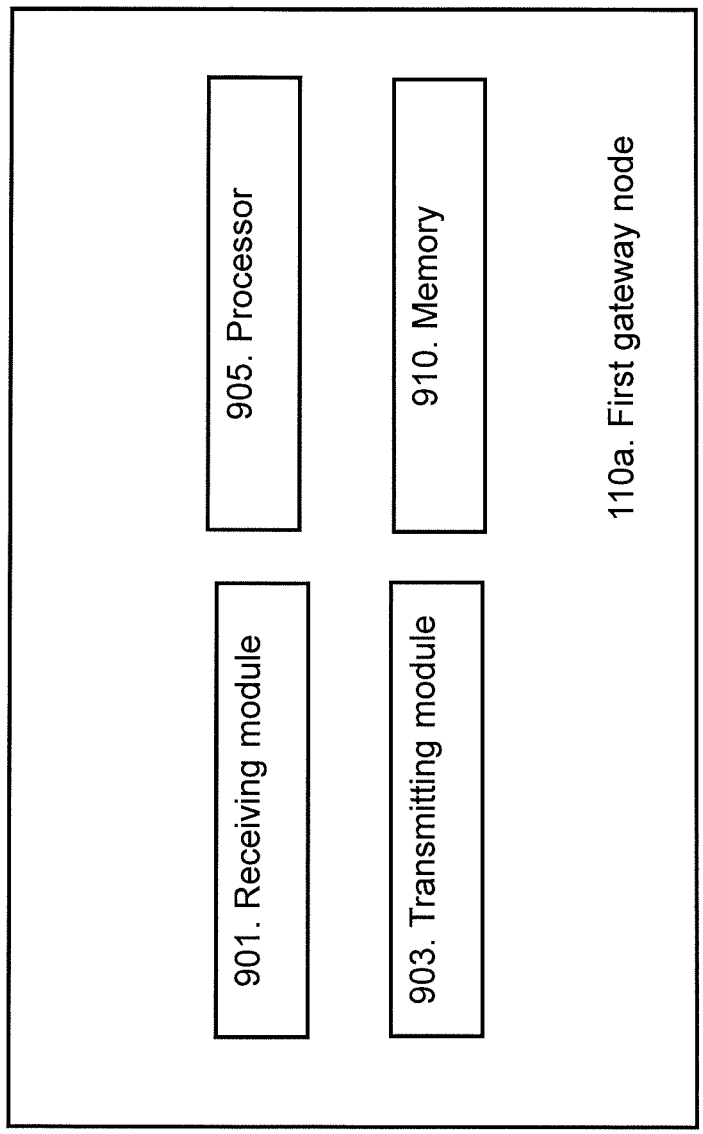
FIG. 9 is schematic block diagram illustrating embodiments of a first gateway node.

To perform the method steps shown in FIG. 8 for handling overload in a communications network the first gateway node 110 comprises an arrangement as shown in FIG. 9. The first gateway node 110a may be a SGW or a PGW or a combined SGW and PGW node.

The first gateway node 110a is configured to, e.g. by means of a receiving module 901, receive, from a mobility management node 108, a request message for information of at least one used IP address of IP packets which has been previously sent by the UE 101. The receiving module 901 may also be referred to as a receiving unit, a receiving means, a receiving circuit, means for receiving or an input unit. The receiving module 901 may be a receiver, a transceiver etc. The receiving module 901 may be a wireless receiver of the first gateway node 110a of a wireless or fixed communications system.

The first gateway node 110a is configured to, e.g. by means of a transmitting module 903, transmit, to the mobility management node 108, a response message comprising information of at least one used IP address. The at least one used IP address is transmitted to the mobility management node 108 from the first gateway node 110a as part of a Non Access Stratum, NAS, Service Request procedure, as part of an S1 Release procedure, as part of a Detach procedure or as part of a Delete Packet Data Network, PDN, Connection procedure. The transmitting module 903 may also be referred to as a transmitting unit, a transmitting means, a transmitting circuit, means for transmitting or an output unit. The transmitting module 903 may be a transmitter, a transceiver etc. The transmitting module 903 may be a wireless transmitter of the first gateway node 110a of a wireless or fixed communications system.

In some embodiments, the first gateway node 110a is further configured to, e.g. by means of the transmitting module 903, when overload in the communications network 100 has been detected, transmit, to the mobility management node 108 information indicating at least one blocked IP address to which access should be blocked.

In some embodiments, the first gateway node 110a comprises a processor 905 and a memory 910. The memory 910 comprises instructions executable by the processor 905. The memory 910 may comprise one or more memory units. The memory 910 is arranged to be used to store data, received data streams, used IP address(es), blocked IP address(es), indications, flags, request messages, response messages, threshold values, time periods, configurations, schedulings, and applications to perform the methods herein when being executed in the first gateway node 110a.

Those skilled in the art will also appreciate that the receiving module 901 and the transmitting module 902 described above may refer to a combination of analog and digital circuits, and/or one or more processors configured with software and/or firmware, e.g. stored in a memory, that when executed by the one or more processors such as the processor 905 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 10:
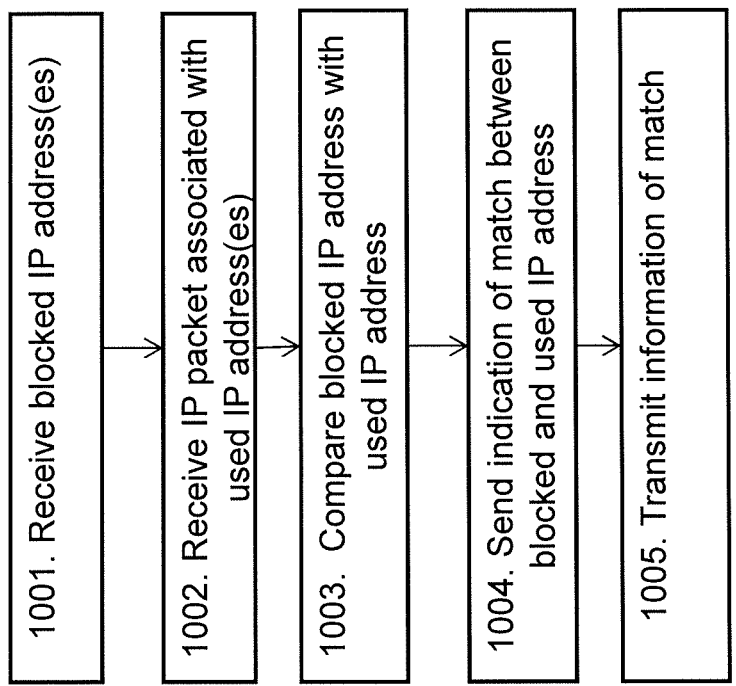
FIG. 10 is a flow chart illustrating embodiments of a method in a second gateway node.

The method described above will now be described seen from the perspective of the second gateway node 110. FIG. 10 is a flowchart describing the present method in the second gateway node 110 for handling overload in a communications network 1000. The second gateway node 110b may be a SGW or a PGW or a combined SGW and PGW node. The method comprises the following steps to be performed by the second gateway node 110, which steps may be performed in any suitable order than described below:

Step 1001

This step corresponds to step 504 in FIG. 5a. The second gateway node 110b receives from a mobility management node 108, information indicating at least one blocked IP address to which access should be blocked. In some embodiments, access to least one blocked IP address should be blocked because a server associated with the blocked IP address is overloaded.

Step 1002

This step corresponds to step 507 in FIG. 5a. The second gateway node 110b receives an IP packet associated with a used IP address. The IP packet may be a service request or an attach request.

Step 1003

This step corresponds to step 508 in FIG. 5. The second gateway node 110b compares used IP packets with the at least one blocked IP address.

Step 1004

This step corresponds to step 512 in FIG. 5b. The second gateway node 110b transmits, to the mobility management node 108, information indicating that the comparison resulted in a match between at least one blocked IP address and at least one used IP address.

Step 1005

This step corresponds to step 512 in FIG. 5b. In some embodiments, the second gateway node 110b transmits information indicating the matching IP address to the mobility management node 108.

A third computer program may comprise instructions which, when executed on at least one processor, cause the at least one processor to carry out the method as described in FIGS. 2-5 and 10. A third carrier may comprise the third computer program. The third carrier may be one of an electronic signal, optical signal, radio signal or computer readable storage medium.

Figure 11:
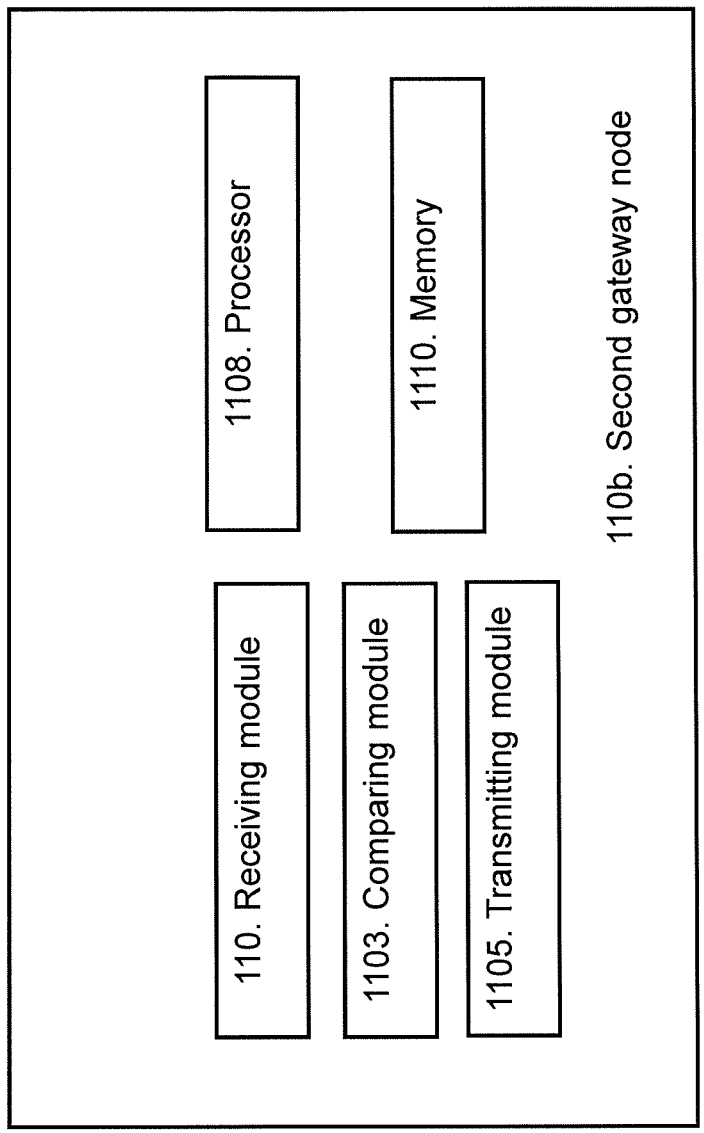
FIG. 11 is a schematic block diagram illustrating embodiments of a second gateway node.
Figure 6:
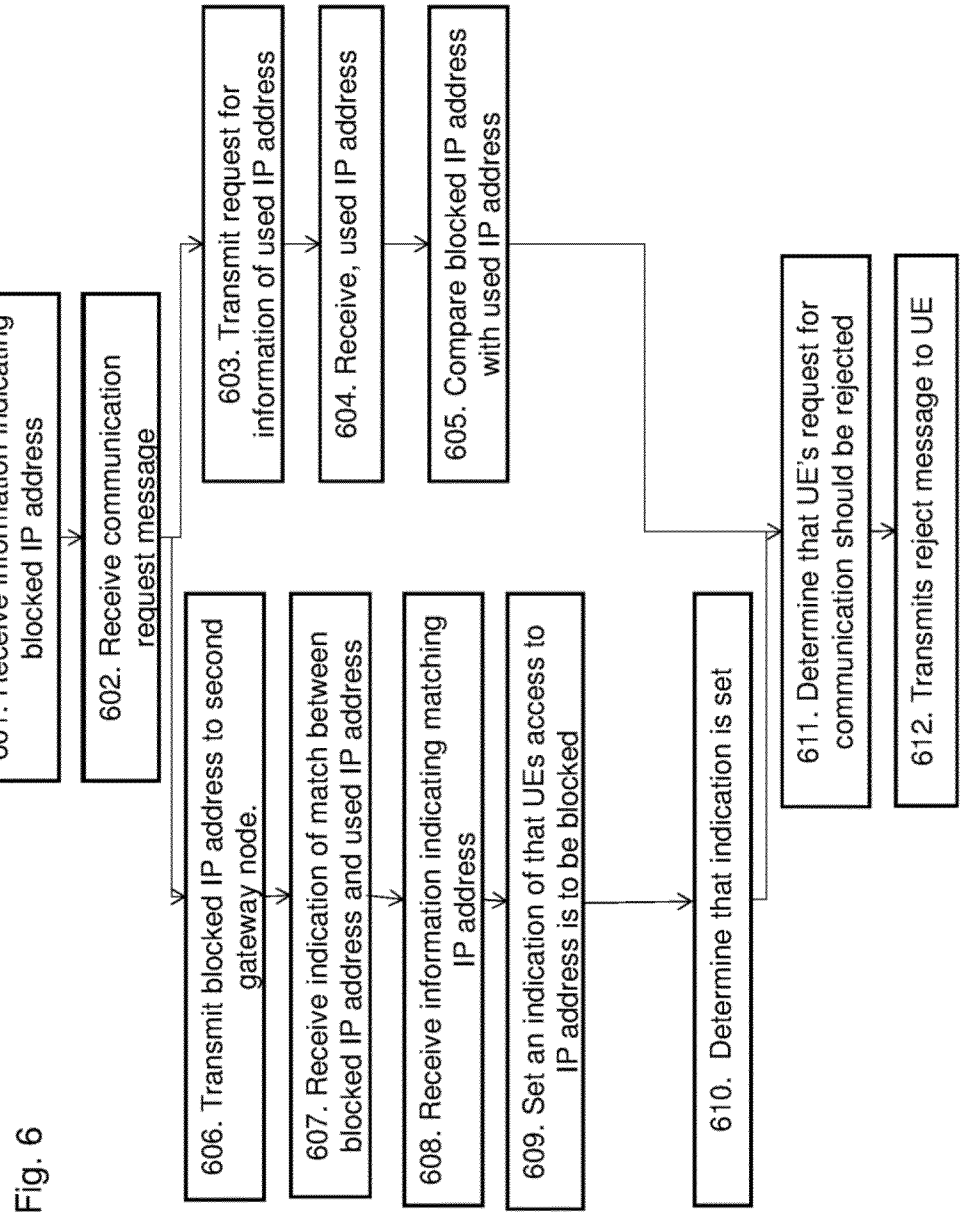

To perform the method steps shown in FIG. 10 for handling overload in a communications network 100 the second gateway node 110 comprises an arrangement as shown in FIG. 11. The second gateway node 110b may be a SGW or a PGW or a combined SGW and PGW node.

The second gateway node 110b is configured to, e.g. by means of a receiving module 1101, receive from a mobility management node 108, information indicating at least one blocked Internet Protocol, IP, address to which access should be blocked.

The second gateway node 110b is configured to, e.g. by means of the receiving module 1101, receive an IP packet associated with a used IP address.

The second gateway node 110b is configured to, e.g. by means of a comparing module 1103, compare used IP packets with the at least one blocked IP address.

The second gateway node 110b is configured to, e.g. by means of a transmitting module 1105, transmit, to the mobility management node 108, information indicating that the comparison resulted in a match between at least one blocked IP address and at least one used IP address.

In some embodiments, the second gateway node 110b is further configured to, e.g. by means of the transmitting module 1105, transmit information indicating the matching IP address to the mobility management node 108.

In some embodiments, the second gateway node 110b comprises a processor 1108 and a memory 1110. The memory 1110 comprises instructions executable by the processor 1108. The memory 1110 may comprise one or more memory units. The memory 1110 is arranged to be used to store data, received data streams, used IP address(es), blocked IP address(es), indications, flags, request messages, response messages, threshold values, time periods, configurations, schedulings, and applications to perform the methods herein when being executed in the second gateway node 110b.

Those skilled in the art will also appreciate that the receiving module 1101, the comparing module 1103 and the transmitting module 1105 described above may refer to a combination of analog and digital circuits, and/or one or more processors configured with software and/or firmware, e.g. stored in a memory, that when executed by the one or more processors such as the processor 1108 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The present mechanism for handling overload in the communications network 100 may be implemented through one or more processors, such as a processor 705 in the mobility management node arrangement depicted in FIG. 7, a processor 905 in the first gateway node arrangement depicted in FIG. 9 and a processor 1108 in the second gateway node arrangement depicted in FIG. 11, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into at least one of the mobility management node 108, the first gateway node 110 and the second gateway node 110. One such carrier may be in the form of a CD ROM disc. It is however feasible with other data carriers such as a memory stick. The computer program code can furthermore be provided as pure program code on a server and downloaded to at least one of the mobility management node 108, the first gateway node 110 and the second gateway node 110.

Summarized, the embodiments herein may be used to control overload on IP address level in the network. Primarily M2M devices but in some situations also Smartphones may if a server in the network becomes unreachable, be programmed to repeat trying to connect to the server. If the repetition frequency is high and/or the number of devices/smartphones is large, the embodiments herein may be used to very selectively block precisely the communication requests that are causing the overload. This is done by in the network remembering at least the most recent IP address(es) UEs 101 communicate with and then reject communication service requests for UEs 101 that have previously communicated with the IP address(es) that are causing the overload or overload situation. This is the most selective form of overload control possible.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A method in a mobility management node for handling overload in a communications network, the method comprising:
   receiving information at the mobility management node indicating a blocked Internet Protocol, IP, address to which access should be blocked, wherein the blocked IP address is a destination address associated with a server where overload has been detected;
   receiving a communication request message at the mobility management node from a User Equipment, UE, via a Radio Access Network, RAN, node, wherein the communication request message is a request for communication by the UE;
   determining that the UE's request for communication should be rejected, wherein the determining is based on a used IP address used by the UE a previous time the UE was attached to the communications network; and
   rejecting the UE's request for communication.

2. The method of claim 1, wherein the determining further comprises:
   transmitting, to a gateway node, a request message for information of at least one used IP address; and,
   receiving, from the gateway node, a response message comprising the used IP address.

3. The method of claim 2, further comprising:
   comparing the blocked IP address and the used IP address; and
   determining that the comparing indicates a match between the blocked IP address and the used IP address.

4. The method of claim 1, further comprising:
   transmitting the received information indicating the blocked IP address to a gateway node;
   receiving, from the gateway node, information indicating that there is a match between the blocked IP address and the used IP address; and
   setting an indication indicating that the UE is to be blocked.

5. The method of claim 4, wherein the determining that the UE's request for communication should be rejected further comprises:
   determining that the indication indicating that the UE is to be blocked is set.

6. The method according to claim 1, wherein the mobility management node is a Mobility Management Entity, MME, or a Serving General packet radio service Support Node, SGSN, or a combined SGSN and MME node.

7. A non-transitory computer readable storage medium comprising a computer program comprising instructions which, when executed on at least one processor, cause the at least one processor to carry out the method according to claim 1.

8. A method in a gateway node for handling overload in a communications network, the method comprising:
   receiving, from a mobility management node, information indicating a blocked Internet Protocol, IP, address to which access should be blocked, wherein the blocked IP address is a destination address associated with a server where overload has been detected;
   receiving a packet associated with a User Equipment, UE, the packet comprising a used IP address;
   comparing the blocked IP address with the used IP address;
   determining that the blocked IP address matches the used IP address;
   setting an indication that the comparing resulted in a match between the blocked IP address and the used IP address;
   transmitting, to the mobility management node, a message comprising information indicating that the UE is to be blocked.

9. The method of claim 8, wherein the transmitting the message comprises transmitting the message to a second gateway node.

10. The method of claim 9, wherein the message is an Update Bearer Request message.

11. The method of claim 8, wherein the wherein the message is a Release Access Bearer Response message.

12. The method of claim 8, wherein the message further comprises information about one or more of the blocked IP address or the used IP address.

13. The method of claim 8, wherein the setting an indication comprises setting a flag.

14. The method of claim 8, wherein the gateway node is a Serving GateWay, SGW, or a Packet data network GateWay, PGW, or a combined SGW and PGW node.

15. A non-transitory computer readable storage medium comprising a second computer program comprising instructions which, when executed on at least one processor, cause the at least one processor to carry out the method according to claim 8.

16. A mobility management node for handling overload in a communications network, the mobility management node comprising a processor and a memory, the processor being configured to:
   receive information at the mobility management node indicating a blocked Internet Protocol, IP, address to which access should be blocked, wherein the blocked IP address is a destination address associated with a server where overload has been detected;
   receive a communication request message at the mobility management node from a User Equipment, UE, via a Radio Access Network, RAN, node, wherein the communication request message is a request for communication by the UE;
   determine that the UE's request for communication should be rejected, wherein the determining is based on a used IP address used by the UE a previous time the UE was attached to the communications network; and
   reject the UE's request for communication.

17. The mobility management node of claim 16, wherein the processor is further configured to:
   transmit, to a gateway node, a request message for information of at least one used IP address; and,
   receiving, from the gateway node, a response message comprising the used IP address.

18. The mobility management node of claim 17, wherein the processor is further configured to:
   compare the blocked IP address and the used IP address; and
   determine that the comparing indicates a match between the blocked IP address and the used IP address.

19. The mobility management node of claim 17, wherein the processor is further configured to:
   transmit the received information indicating the blocked IP address to a gateway node;
   receive, from the gateway node, information indicating that there is a match between the blocked IP address and the used IP address; and
   set an indication indicating that the UE is to be blocked.

20. A gateway node for handling overload in a communications network, the gateway node comprising a processor and a memory, the processor being configured to:
- receive, from a mobility management node, information indicating a blocked Internet Protocol, IP, address to which access should be blocked, wherein the blocked IP address is a destination address associated with a server where overload has been detected;
- receive a packet associated with a User Equipment, UE, the packet comprising a used IP address;
- compare the blocked IP address with the used IP address;
- determine that the blocked IP address matches the used IP address;
- set an indication that the comparing resulted in a match between the blocked IP address and the used IP address;
- transmit, to the mobility management node, a message comprising information indicating that the UE is to be blocked.

* * * * *

UNITED STATES PATENT AND TRADEMARK OFFICE
CERTIFICATE OF CORRECTION

PATENT NO. : 11,297,061 B2
APPLICATION NO. : 17/024961
DATED : April 5, 2022
INVENTOR(S) : Hans Bertil Rönneke et al.

Page 1 of 4

It is certified that error appears in the above-identified patent and that said Letters Patent is hereby corrected as shown below:

On the Title Page

In Item (73), under "Assignee", in Column 1, Lines 1-2, delete "TELEPONAKTIEBOLAGET L M ERICSSON (PUBL)," and insert -- TELEFONAKTIEBOLAGET LM ERICSSON (PUBL), --.

In the Drawings

Replace Sheet 9 of 14 (Fig. 6) with the attached sheet.

Sheet 10 of 14 (Fig. 7), for Tag "108", Line 1, delete "Mobilty" and insert -- Mobility --.

Sheet 14 of 14 (Fig. 11), delete "110. Receiving module" and insert -- 1101. Receiving module --.

In the Specification

In Column 1, Line 8, delete "2014," and insert -- 2014, now U.S. Pat. No. 10,812,488, --.

In Column 3, Lines 22-23, delete "that that" and insert -- that --.

In Column 4, Line 12, delete "is schematic" and insert -- is a schematic --.

In Column 4, Line 33, delete "(WLAN)." and insert -- (WLAN)). --.

In Column 4, Line 41, delete "providers" and insert -- provider's --.

In Column 5, Lines 12-13, delete "node 100a." and insert -- node 110a. --.

In Column 5, Line 13, delete "node 100b" and insert -- node 110b --.

In Column 5, Line 44, delete "node 100a" and insert -- node 110a --.

Signed and Sealed this
Twenty-fifth Day of April, 2023

Katherine Kelly Vidal
*Director of the United States Patent and Trademark Office*

CERTIFICATE OF CORRECTION (continued)
U.S. Pat. No. 11,297,061 B2

In Column 5, Line 45, delete "node 100b." and insert -- node 110b. --.

In Column 7, Line 3, delete "control" and insert -- control. --.

In Column 7, Line 52, delete "IP address 3" and insert -- IP address --.

In Column 9, Line 15, delete "of used" and insert -- used --.

In Column 10, Line 45, delete "store" and insert -- storing --.

In Column 11, Lines 27-28, delete "Management" and insert -- Maintenance --.

In Column 12, Line 25, delete "is" and insert -- it --.

In Column 13, Line 39, delete "is" and insert -- it --.

In Column 13, Line 67, delete "FIG. 4b)." and insert -- FIG. 4a). --.

In Column 14, Line 66, delete "Management" and insert -- Maintenance --.

In Column 15, Line 43, delete "step" and insert -- steps --.

In Column 16, Line 2, delete "steps 500-508," and insert -- steps 500-508b, --.

In Column 16, Line 39, delete "FIG. 4a." and insert -- FIG. 4b. --.

In Column 17, Line 15, delete "about of IP" and insert -- about IP --.

In Column 17, Line 18, delete "about of IP" and insert -- about IP --.

In Column 17, Line 22, delete "about of IP" and insert -- about IP --.

In Column 17, Line 32, delete "step" and insert -- steps --.

In Column 19, Line 2, delete "about of" and insert -- about --.

In Column 19, Lines 42-43, delete "step 509 to 5016" and insert -- steps 509 to 516 --.

In Column 19, Line 45, delete "step" and insert -- steps --.

In Column 20, Line 10, delete "Step 512" and insert -- Step 521 --.

In Column 21, Line 1, delete "least" and insert -- at least --.

In Column 22, Line 8, delete "FIG. 5b.In" and insert -- FIG. 5b. In --.

In Column 25, Line 15, delete "least" and insert -- at least --.

In Column 25, Line 51, delete "receive ," and insert -- receive, --.

In Column 28, Line 28, delete "module 902" and insert -- module 903 --.

In Column 26, Line 44, delete "network 1000." and insert -- network 100. --.

In Column 26, Line 57, delete "least" and insert -- at least --.

In Column 28, Line 29, delete "CD ROM" and insert -- CD-ROM --.

In the Claims

In Column 30, Line 12, in Claim 11, delete "wherein the wherein the" and insert -- wherein the --.